US005815117A

United States Patent [19]
Kolanek

[11] Patent Number: 5,815,117
[45] Date of Patent: Sep. 29, 1998

[54] DIGITAL DIRECTION FINDING RECEIVER

[75] Inventor: James C. Kolanek, Goleta, Calif.

[73] Assignee: Raytheon Company, Lexington, Mass.

[21] Appl. No.: 778,053

[22] Filed: Jan. 2, 1997

[51] Int. Cl.$^6$ ....................................................... G01S 5/04
[52] U.S. Cl. ............................................................. 342/442
[58] Field of Search .................................... 342/442, 443,
342/444, 445; 343/893, 904; 442/82.08,
108; 324/207.15, 236, 607, 654, 658

[56] References Cited

U.S. PATENT DOCUMENTS 5,514,337   5/1996   Groger et al. ........................ 422/82.07

*Primary Examiner*—William L. Oen
*Attorney, Agent, or Firm*—Michaelson & Wallace

[57] ABSTRACT

The invention is embodied in a digital direction finding receiver having N frequency channels spanning a frequency band of the receiver and capable of receiving signals simultaneously from a plurality of antennas spaced from one another, one of the antennas including a reference location antenna. The receiver of the invention includes a plurality of analog-to-digital converters having their analog inputs connected to respective ones of the antennas, a reference source capable of outputting a reference digital signal containing at least a local frequency component within a selected one of the N frequency channels, a plurality of digital down converter modules, each one of the digital down converter modules having a reference input connected to the reference source and a signal input connected to the digital output of a respective one of the analog-to-digital converters, each the digital down converter modules including a multiplier for producing at an output of the digital down converter a product of the reference signal and the signal from the respective one of the antennas, and a digital phase detector having plural phase detector signal inputs connected to the outputs of remaining ones of the digital down converters, the phase detector detecting phase angles of signals on each of the phase detector signal inputs relative to a corresponding signal received at the reference antenna.

19 Claims, 13 Drawing Sheets

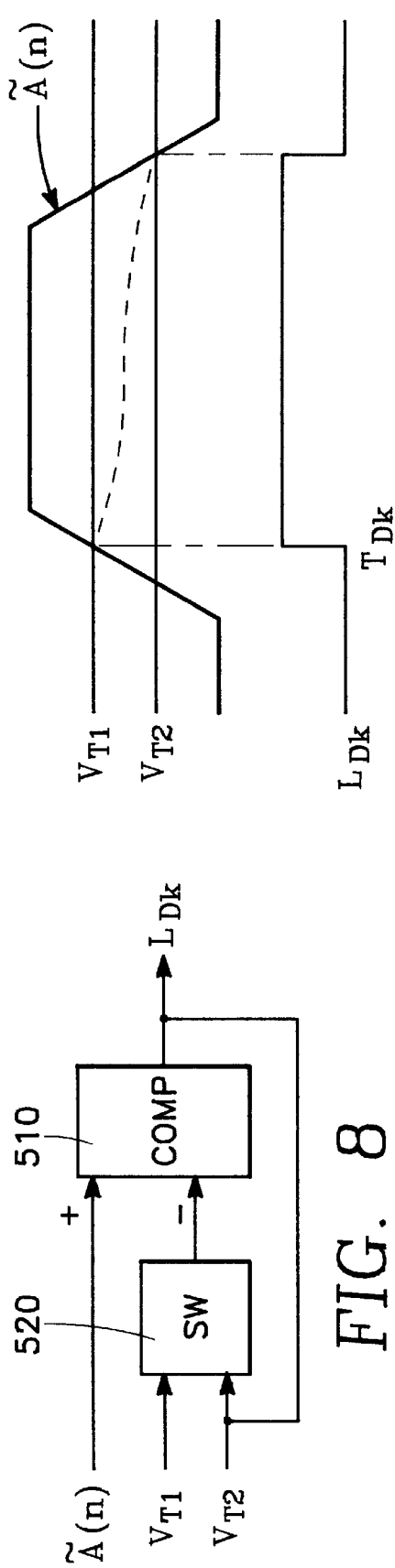
FIG. 9
FIG. 8
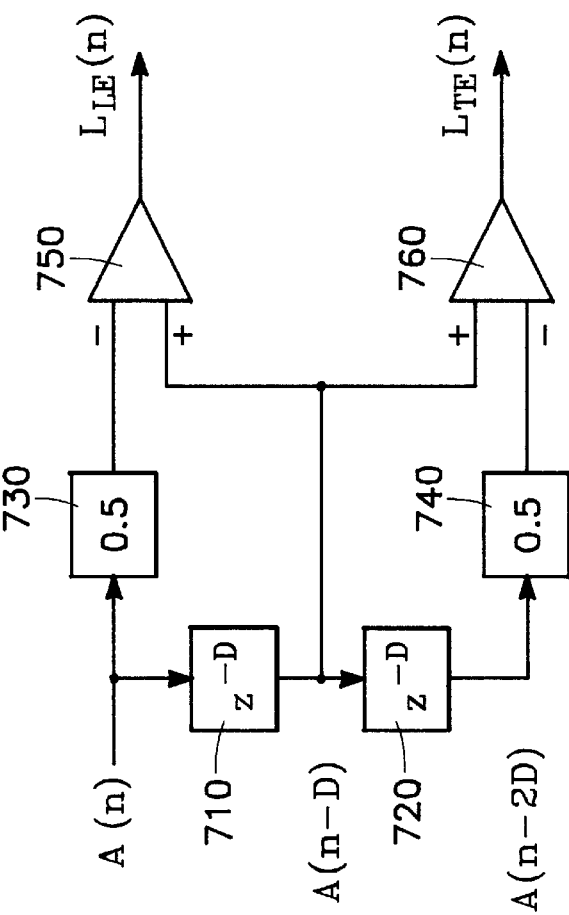
FIG. 10

| LOGIC TEST NO. | LOGIC TEST | TEST CASE $P_1$ | $P_2$ | $P_3$ | $P_4$ | $P_5$ | $P_6$ | $P_7$ | $P_8$ | $P_9$ |
|---|---|---|---|---|---|---|---|---|---|---|
| $L_1$ | $A_{k+1} > V_{T2}$ | F | T | F | T | T | F | T | T | T |
| $L_2$ | $A_k > V_{T2}$ | T | T | T | T | T | T | T | T | T |
| $L_3$ | $A_{k-1} > V_{T2}$ | F | F | T | T | F | T | T | T | T |
| $L_4$ | $A_k > A_{k+1}$ |  | T |  | T | F |  | T | F | F |
| $L_5$ | $A_k > A_{k-1}$ |  |  | T | T |  | F | F | T | F |
| $L_6$ | $|f_k - f_{k+1}| > F_\Delta$ |  |  |  |  | T |  | T |  | T |
| $L_7$ | $|f_k - f_{k-1}| > F_\Delta$ |  |  |  |  |  | T |  | T | T |
| $L_{CA}$ VALID CHANNEL ARBITRATION | | T | T | T | T | T | T | T | T | T |

FIG. 11

| LOGIC TEST NO. | LOGIC TEST | TEST CASE $P_1$ | $P_2$ |
|---|---|---|---|
| $L_1$ | $F_{(k)} < F_{LOW}$ | F | T |
| $L_2$ | $F_{(k)} > F_{HI}$ | T | F |
| $L_3$ | $A_{(k+1)} > V_{FT}$ | T | T |
| $L_4$ | $A_{(k-1)} > V_{FT}$ | T | T |
| $L_5$ | $A_{(k+1)} > A_{(k-1)}$ | T | T |
| $F_{PDW} =$ | | $F(k)-1$ | $F(k)+1$ |

OTHERWISE $F_{PDW} = F(k)$

DIGITAL DIRECTION FINDING RECEIVER

BACKGROUND OF THE INVENTION

1. Technical Field

The invention is related to radio direction finding receivers and in particular to digital direction finding receivers operating in radio frequency (RF) bands.

2. Background Art

An RF direction finding receiver typically employs a linear array of RF antennas, each antenna having its own RF receiver circuit, and is adept at measuring the angle of arrival of a radio signal from a point source. At long distances, the radio signal from a point source appears as a planar wave front to a linear array of relatively small length. The direction finding receiver infers the incoming signal's angle of arrival from the phases of the incoming signal measured at respective antennas of the linear array. The angle of arrival is a function of the separation distance between two different ones of the antennas in the linear, the incoming signal's frequency, and the difference in the phase of the incoming signal as measured at the two different antennas. Since a typical antenna array has many pairs of adjacent antennas, different observations of the angle of arrival may be correlated to produce a highly reliable average measurement of the angle of arrival.

The direction finding problem is difficult in practical application because the frequency of the incoming signal typically is not known before its reception at the direction finding receiver. In fact, the direction finding receiver may be required to operate over a very broad frequency band and an incoming signal may lie anywhere within the band. The best approach in such a case is to implement the direction finding receiver as a digital device and employ digital channelizers to divide the broad frequency band at each antenna into M plural frequency channels (each narrower than the broad frequency band) to be processed individually. M is any suitable integer. FIG. 1 illustrates a digital direction finding receiver of this type.

Referring to the example of FIG. 1, the linear array of antenna consists of a suitable number of antennas 32a–32e, (e.g., there are five such antennas in the example of FIG. 1). The outputs of the antennas are detected in respective RF circuits 31a–31e, and the detected RF signals are sampled and converted to digital signals by respective analog-to-digital converters 32a–32e. Digital channelizers 34a–34e divide the digital signals from the analog-to-digital converters 32a–32e into N narrower frequency channels of uniform bandwidth. The antenna 30e is treated as the reference point in the example of FIG. 1. A phase detector 35 compares the phase of a selected channel from each antenna 30a–30d with the phase of the corresponding channel from the reference antenna 30e. This comparison produces a measured angle of arrival of an incoming signal in the selected channel for each of the antennas 30a–30d.

The phase detector 35 includes multipliers 36a–36d, which multiply the selected channel from a corresponding antenna 30a–30d with the same channel signal from the reference antenna 30e. The output from each multiplier 36 contains the phase angle between the two multiplied signals along with higher order terms. Low pass filters 38a–38d at the outputs of the multipliers 36a–36d filter out the higher order terms and pass only the lowest frequency components to respective coordinate rotation computers 40a–40d. The coordinate rotation computers 40a–40d compute the phase of the signals at the outputs of the low pass filters 38a–38d. The coordinate rotation computers 40a–40d transform their received signals into polar coordinates, namely amplitude and a phase angle, and output the phase angle, which is then used in a conventional manner by an angle-of-arrival encoder 42 to estimate the angle of arrival of a signal in the selected channel.

The digital direction finding receiver may be combined with a parameter encoder system 43 which measures various parameters (e.g., frequency, pulse width, etc.) of the incoming signal.

The main problem with the digital direction finding receiver of FIG. 1 is that a relatively large number of digital channelizers are required, i.e., one for each antenna 30. This represents a large hardware cost and is undesirable.

SUMMARY OF THE INVENTION

The invention is embodied in a digital direction finding receiver having N frequency channels spanning a frequency band of the receiver and capable of receiving signals simultaneously from a plurality of antennas spaced from one another, one of the antennas including a reference location antenna. The receiver of the invention includes a plurality of analog-to-digital converters having their analog inputs connected to respective ones of the antennas, a reference source capable of outputting a reference digital signal containing at least a local frequency component within a selected one of the N frequency channels, a plurality of digital down converter modules, each one of the digital down converter modules having a reference input connected to the reference source and a signal input connected to the digital output of a respective one of the analog-to-digital converters, each the digital down converter modules including a multiplier for producing at an output of the digital down converter a product of the reference signal and the signal from the respective one of the antennas, and a digital phase detector having plural phase detector signal inputs connected to the outputs of remaining ones of the digital down converters, the phase detector detecting phase angles of signals on each of the phase detector signal inputs relative to a corresponding signal received at the reference antenna. The reference signal source can be a digital local oscillator capable of outputting a digital local oscillator signal as the digital reference signal having a local oscillator frequency within a selected one of the N frequency channels. The local oscillator frequency preferably is a center frequency of the selected one of the N frequency channels. The phase detector can include a phase detector reference input connected to the digital down converter output corresponding to the reference antenna and the phase detector senses phase differences between its reference input and each of its signal inputs. The reference signal source can include memory apparatus capable of receiving and storing digital signals of successive samples of N parallel channelized signals of the N frequency channels, switch apparatus capable of selecting from the memory apparatus the one digital signal corresponding to the selected one of the frequency channels and applying the one digital signal as the reference signal to the local oscillator input of each of the digital down converter modules. Each of the digital down converters corresponds to one of the antennas except the reference antenna. The phase detector constitutes a coordinate transformer capable of extract the phase angle of the output of each of the digital down converters. Each the memory apparatus can be a first-in-first-out memory. Each of the digital down converter modules includes a memory capable of storing a signal from the corresponding analog-to-digital converter and outputting the signal so stored in synchronism with the reference signal from the reference signal source. Each memory can be a first-in-first-out memory. The invention can further include a controller responsive to identification of one or more of the N frequency channels and capable of storing the identity of the one or more frequency channels and causing the reference signal source to output the corresponding reference signals in succession and causing the memory of each of the digital down converters to repeat its stored signal in synchronism with the succession of corresponding reference signals, whereby the phase detector measures a phase angle for each signal arriving in a respective channel concurrently. The receiver can further include a digital channelizer having its digital input connected to the digital output of the analog-to-digital converter of the reference antenna and having N channelized digital outputs corresponding to the N frequency channels and having the N channelized signals. Each of the digital down converters can further include a low pass filter at the output of the multiplier of the digital down converter. The phase detector can include a phase detector multiplier connected to the phase detector reference input and a corresponding one of the phase detector signal inputs, a low pass filter at the output of the phase detector multiplier and a coordinate transformer for extracting a phase angle from the output of the low pass filter. The receiver can further include detection and arbitration logic for selecting one or more of the channels by determining which of the channels contain valid signals. The detection and arbitration logic can include a leading edge detector and a channel arbitrator for resolving ambiguities between channels.

BRIEF DESCRIPTION OF THE DRAWINGS

FIG. 8 is a block diagram of a threshold detector circuit employed in the channel processing module of FIG. 6.

FIG. 9 is a graph including a time domain waveform of an incoming pulse illustrating the operation of the threshold detector of FIG. 8.

FIG. 10 is a block diagram of a leading edge/trailing edge detector employed in the channel processing module of FIG. 6.

FIG. 11 is a truth table defining a channel arbitration function of arbitration logic in the channel processing module of FIG. 6.

FIG. 12 is a truth table defining a frequency arbitration function of the arbitration logic of the channel processing module of FIG. 6.

DETAILED DESCRIPTION OF THE PREFERRED EMBODIMENTS

Figure 2:
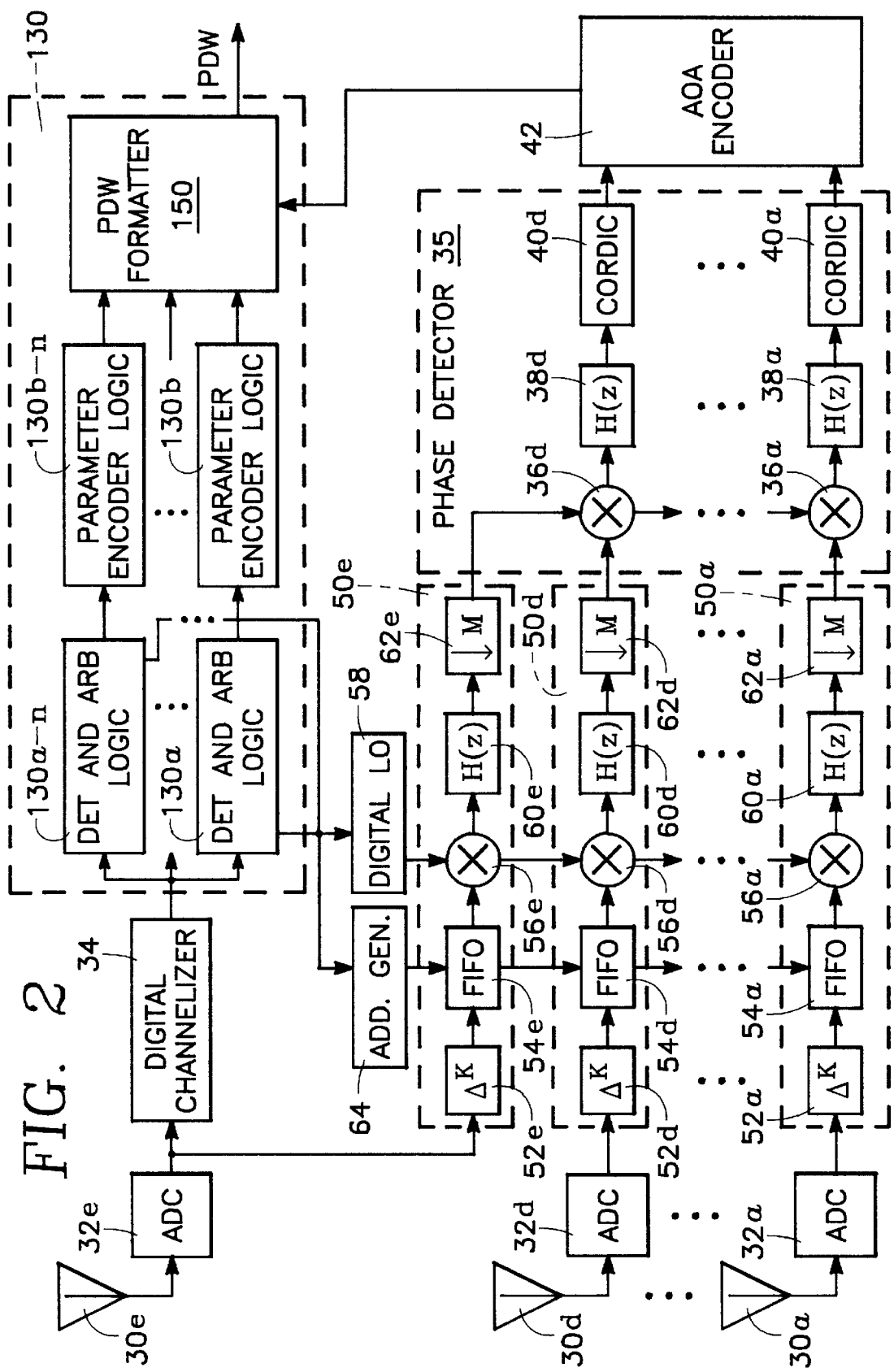
FIG. 2 is a schematic block diagram of a digital direction finding receiver in accordance with a first embodiment of the invention.

FIG. 2 illustrates a first preferred embodiment of the invention. In FIG. 2, the digital channelizers 34 are replaced by digital down converter modules 50a–50e, with the exception of the reference antenna's digital channelizer 34e. These digital down converter modules are far simpler and more cost effective than the digital channelizers they replace, a significant advantage. For example, each digital channelizer 34 includes banks of polyphase filters, while each digital down converter 50 is a single stage logic circuit.

Each digital down converter module 50 consists of a time delay element 52 connected to the output of the corresponding analog-to-digital converter 32 and a first-in-first-out (FIFO) buffer 54 receiving data at the output of the delay element 52. A multiplier 56 has one of its inputs connected to the output of the FIFO buffer 54 and the other of its inputs connected to a digital local oscillator 58. The digital local oscillator 58 has its output connected to the multipliers 56a–56e of each of the down converter modules 50a–50e.

The digital local oscillator 58 generates a digital signal having a single frequency in the center of a selected one of the N frequency channels of the digital channelizer 34, the selection depending upon which of the N frequency channels contains a valid signal. For this purpose, the digital local oscillator 58 stores the center frequency of each one of the N channels and reproduces a selected one of the center frequencies upon receipt of a signal identifying the corresponding channel. The determination of which channel contains a valid signal is made by arbitration logic circuitry to be described below. Each multiplier 56 (e.g., the multiplier 56c, for example) therefore produces products between the local oscillator signal and the signals in all N frequency channels received by the corresponding antenna (e.g., by the antenna 30c in the example). However, only the received signal lying in the one selected frequency channel produces a product having the minimum frequency difference, which is the only signal passed by a low pass filter 60. Thus, "channelization" of the signals from each of the antennas 30a–30d is achieved without a digital channelizer for each antenna.

The low pass filter 60 has a pass band corresponding to the common bandwidth of all N channels. The bandwidth of the signal passed by the low pass filter 60 is 1/N of the received signal, and so the digital signal output by the low pass filter is preferably decimated by a factor of N by a decimator 62. The decimator 62 passes only every Nth bit and provides the output of its digital down converter 50. Each of the multipliers 36a–36d in the phase detector 35 has one input connected to the corresponding down converter 50a–50d and its other input connected to the reference down converted 50e. As in FIG. 1, the output of each multiplier 36 contains the phase angle between the versions of the signal received at the reference antenna 30e and at one of the other antennas 30a–30d.

Figure 1:
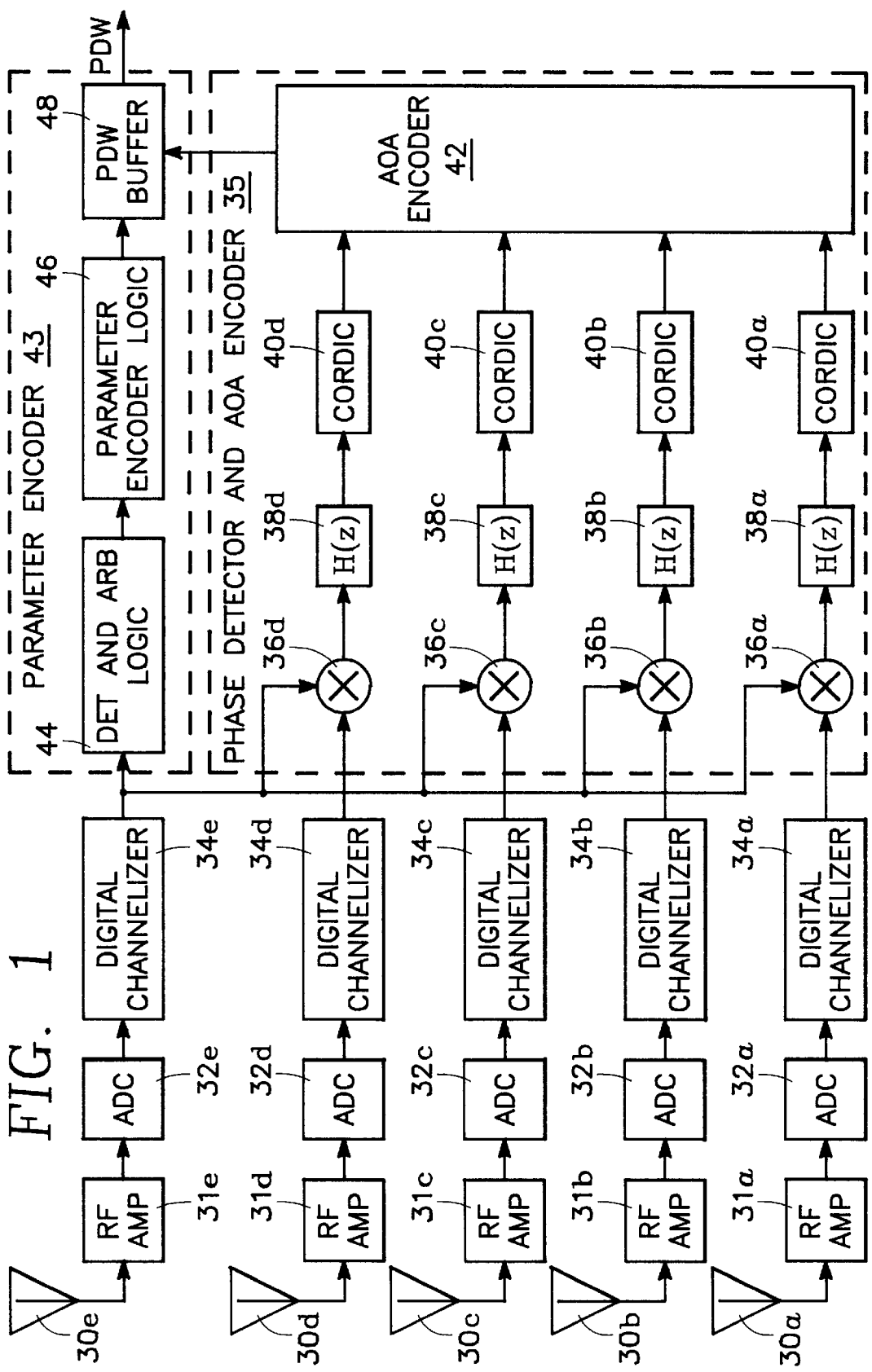
FIG. 1 is a schematic block diagram of a digital direction finding receiver employing one digital channelizer for each antenna in its linear antenna array.

One advantage of the invention is the elimination of all but one of the digital channelizers 34a–34e of FIG. 1, as mentioned above herein. Another advantage is that the FIFO buffers 54a–54e may be implemented as high-speed memories so that the signals stored therein can be repeatedly replicated from the memories (without degradation) while different local oscillator frequencies are output by the local oscillator 58. Thus, many valid signals received simultaneously in different channels may be processed without requiring an increase in processing speed. For this purpose, an address generator 64 outputs control signals (or memory addresses) to each addressable memory 54a–54e to fetch or replicate previously stored signals each time a different local oscillator frequency is to be mixed with the signals.

The embodiment of FIG. 2 may be combined with a parameter encoder 130 which consists of detection and arbitration logic 130a and parameter encoding logic 130b for each channel output by the channelizer 34. A parameter digital word interface 150 may combine the outputs of the parameter encoding logic 130 of all the channels and the angle of arrival encoder 42. The selection of the frequency channel(s) for the digital local oscillator 58 is made automatically by the detection and arbitration logic 130a associated with each channel, and such selections are output to the digital local oscillator 58 and to the address generator 64. The parameter encoder 130 including the detection and arbitration logic 130b will be described in a later section of this specification.

Whenever the detection and arbitration logic 130a of a particular one of the N channels identifies that channel as containing a valid signal, the address generator 64 stores the corresponding channel number along with any other channel number similarly identified at that time. Different signals in different frequency channels may be received simultaneously. In such a case, the detection and arbitration logic units 130a of more than one of the N channels assert their channel numbers. The address generator 64 stores all of the numbers of the identified/selected channels. The address generator 64 then selects a first one of the identified channel numbers and sends a corresponding identifier to the digital local oscillator 58 so that it produces the corresponding channel center frequency. Simultaneously, the address generator 64 commands each FIFO memory 54 to output a copy of its contents to the corresponding one of the multipliers 56. Then, the address generator 64 goes to the next one of the identified channel numbers it has stored and repeats the same operation. In this way, the signals captured in the FIFO memories 54a–d at a particular sample time are repeatedly played back to the multipliers 56a–d while the digital local oscillator 58 produces the frequency of the next one of the identified channels. As a result, the angles of arrival of different signals received in different frequency channels are computed independently using the inputs from all antennas, even if the different signals have been received simultaneously, a significant advantage. The foregoing functions of the address generator 64 may be readily implemented by the skilled worker using conventional logic design techniques.

Figure 3:
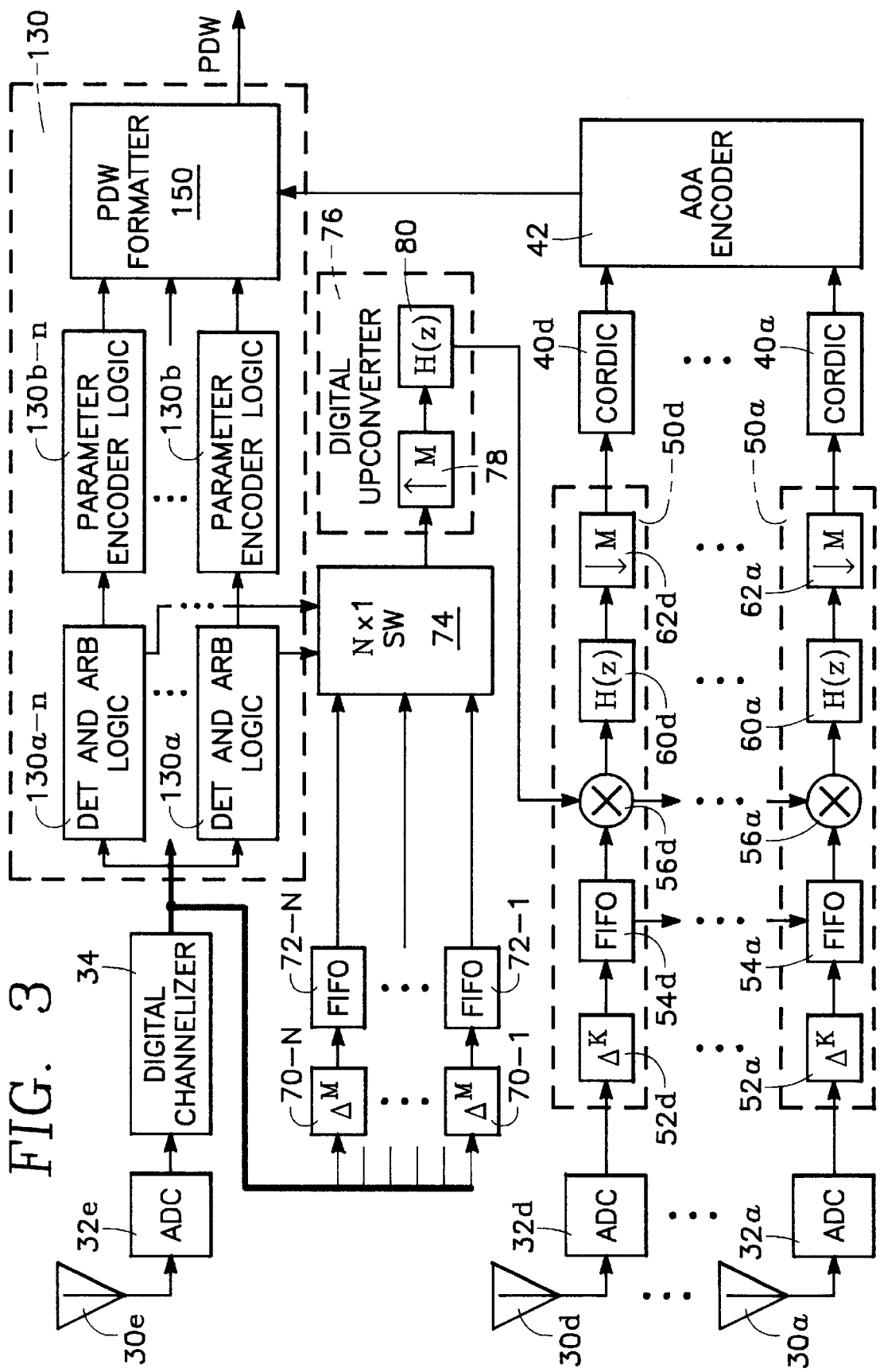
FIG. 3 is a schematic block diagram of a digital direction finding receiver in accordance with a second embodiment of the invention.

In the embodiment of FIG. 3, the output of the local oscillator 58 is replaced by the reference signal of the selected channel—i.e., the signal from the reference antenna 30e. (Thus, the local oscillator 58 is eliminated in the embodiment of FIG. 3.) For this purpose, the signals of all N channels from the reference antenna 30e are delayed in N respective delays 70-1 through 70-N and stored in N respective FIFO memories 72-1 through 72-N, one for each frequency channel of the channelizer 34. An N-by-1 switch 74 responds to the identification of the selected channel by the detection and arbitration logic 130a and connects the output of the corresponding FIFO memory to a digital upconverter 76. The digital upconverter 76 resamples the rate of the selected signal up to the sampling rate of the analog-to-digital converters 32 by a digital interpolator 78 and a smoothing filter 80. The upconverted reference signal from the upconverter 76 is applied to one input of each of the multipliers 56a–56d (in lieu of the local oscillator signal of FIG. 2). Thus, the digital local oscillator 58 of FIG. 2 is replaced by a reference signal source including the N delay elements 70-1 through 70-N, the N FIFO memories 70-1 through 70-N, the N-by-1 switch 74 and the digital upconverter 76.

The output of each digital down converter 50a–50d is a signal containing the phase difference between the corresponding antenna 30a–30d and the reference antenna 30e. This eliminates the need for the multipliers 36a–36d and the low pass filters 38a–38d. The coordinate rotation computers 40a–40d extract the phase coordinate from the output of each digital down converter 50a–50d as in the embodiment of FIG. 2.

The time delay elements 52 (FIG. 2) and 70 (FIG. 3) are for the purpose of compensating for signal processing delays, for example in the detection and arbitration logic 130a. The actual time delays imposed by the time delay elements 52, 70 may vary depending upon the particular hardware and logic design implementation, and are readily determined by the skilled worker in accordance with conventional techniques well-known in the art.

Detection and Arbitration Logic

A superior form of the parameter encoder 130 will now be described because it implements the detection and arbitration logic 130a used by the digital direction finding receivers of FIGS. 2 and 3. The parameter encoder 130 is the subject of co-pending U.S. application Ser. No. 08/778,054 filed Jan. 2, 1997 by the inventors of the present application and entitled "UNIFORM DISCRETE FOURIER TRANSFORM FILTER PARAMETER ENCODER". In the following description, a threshold detector 335, a leading edge/trailing edge detector 355 and a arbitration logic 340 constitute the detection and arbitration logic 130a for each one of the N frequency channels of FIGS. 2 and 3.

Figure 4:
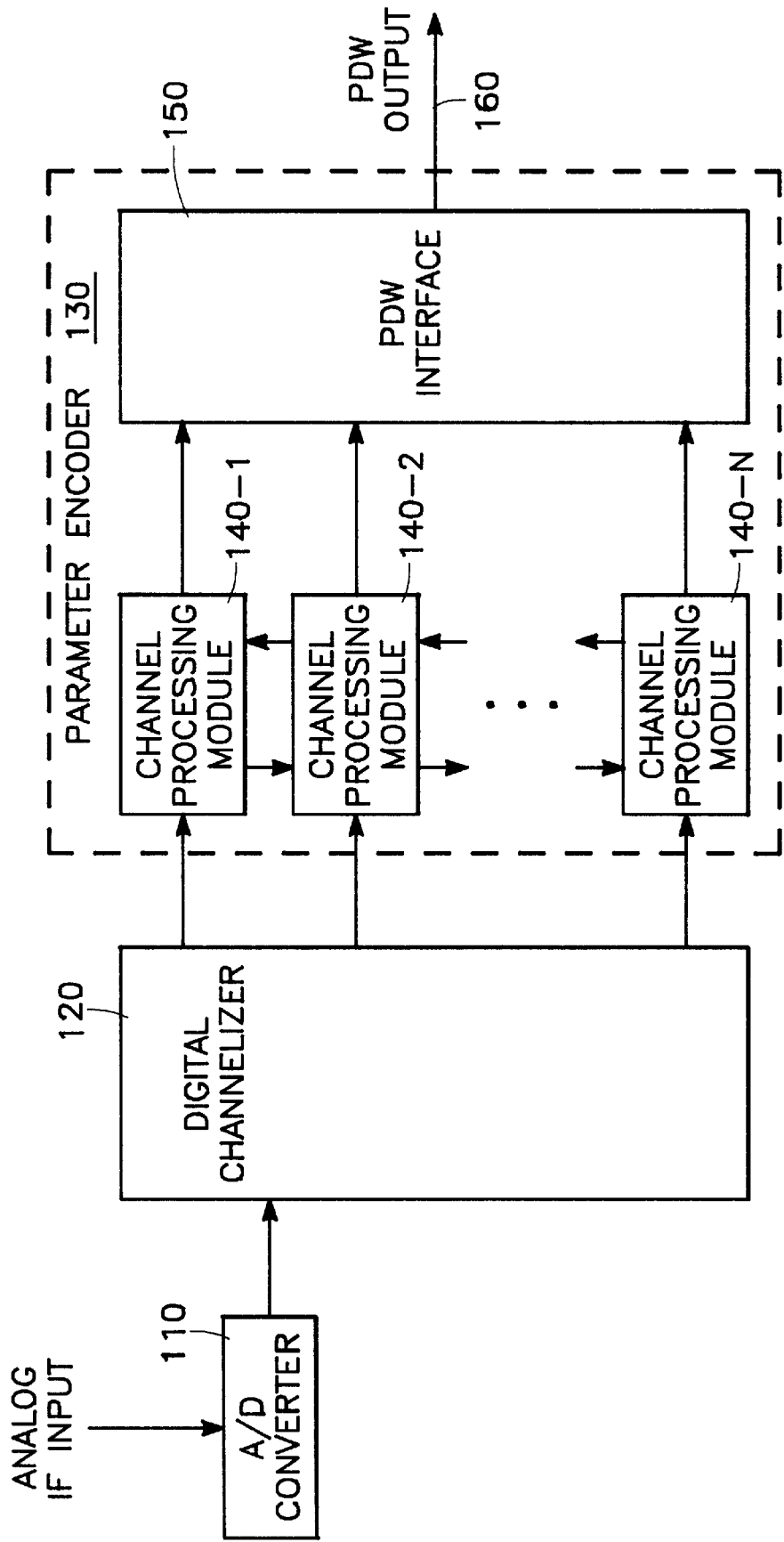
FIG. 4 is a block diagram illustrating a parameter encoder including an array of channel processing modules.
Figure 5A:
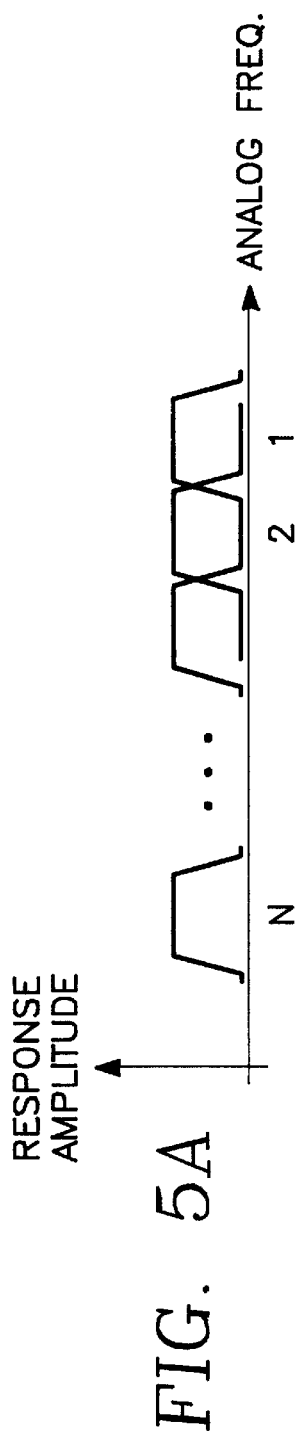
FIGS. 5A and 5B illustrate frequency domain responses of the digital channelizer in the parameter encoder of FIG. 4, FIG. 5B being an enlargement of a portion of FIG. 5A.
Figure 5B:
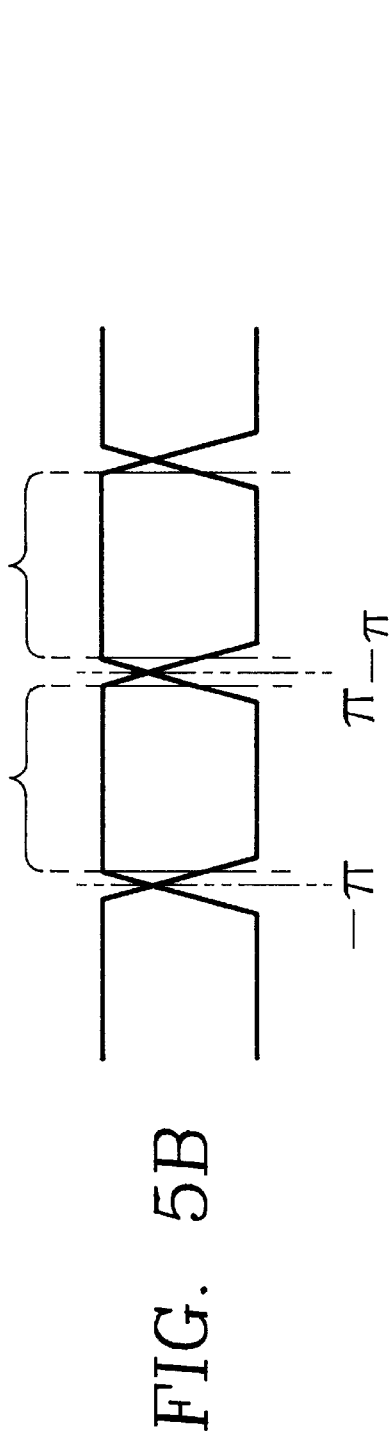

Referring to FIG. 4, a digital RF receiver receives an analog RF input which an analog-to-digital converter 110 converts to a stream of digital words U(n) at a very high sampling rate. The index n refers to an individual word in the stream. Each digital word is complex, consisting of a real part and an imaginary part. A digital channelizer 120 divides the incoming signal U(n) into N channels corresponding to N frequency bins of predetermined bin ranges covering the RF band of the receiver, to produce N channelized signals $X_k(n)$, where k is an index from 1 through N and specifies one of the N channels. Each of the channelized signals is complex, consisting of real and imaginary parts represented by a stream of digital words. Preferably, the digital channelizer consists of a bank of polyphase filters, each filter having a pass band corresponding to a respective one of the N frequency bins or channels. The response of the digital channelizer combined over all N channelized signals as a function of analog frequency across the entire band of the receiver is illustrated in the graph of FIG. 5. The graph of FIG. 5 is actually a superposition of the individual passband responses of the bank of filters constituting the channelizer 120. Each channel corresponds to one pass band, labelled in FIG. 2 as "1" through "N". Below about 6 dB from the peak response, each channel's response overlaps that of the adjacent channel. For those frequencies falling within this overlap, the probability of an aliasing error is high. FIG. 5B is an enlarged view of FIG. 5A showing the overlap between two adjacent channel responses. In the unshaded regions of FIG. 5B, there is no overlap and therefore little chance of aliasing error.

Referring again to FIG. 4, a parameter encoder 130 receives the output of the digital channelizer 120. In the parameter encoder 130, the N channelized output signals $X_k(n)$ of the digital channelizer 120 are processed individually by respective channel processing modules 140. A channel processing module 140 is assigned to each channelized signal, so there are N channel processing modules. Each channel processing module 140 analyzes its channelized signal and outputs a parameter digital word (PDW) specifying the value of each predetermined parameter (e.g., frequency, amplitude, time of arrival, modulation type) for the latest sample time. The outputs of the N channel processing modules 140 are multiplexed in a PDW interface 150 into a single output stream of digital words 160.

Overview of the Channel Processing Module 140

Figure 6:
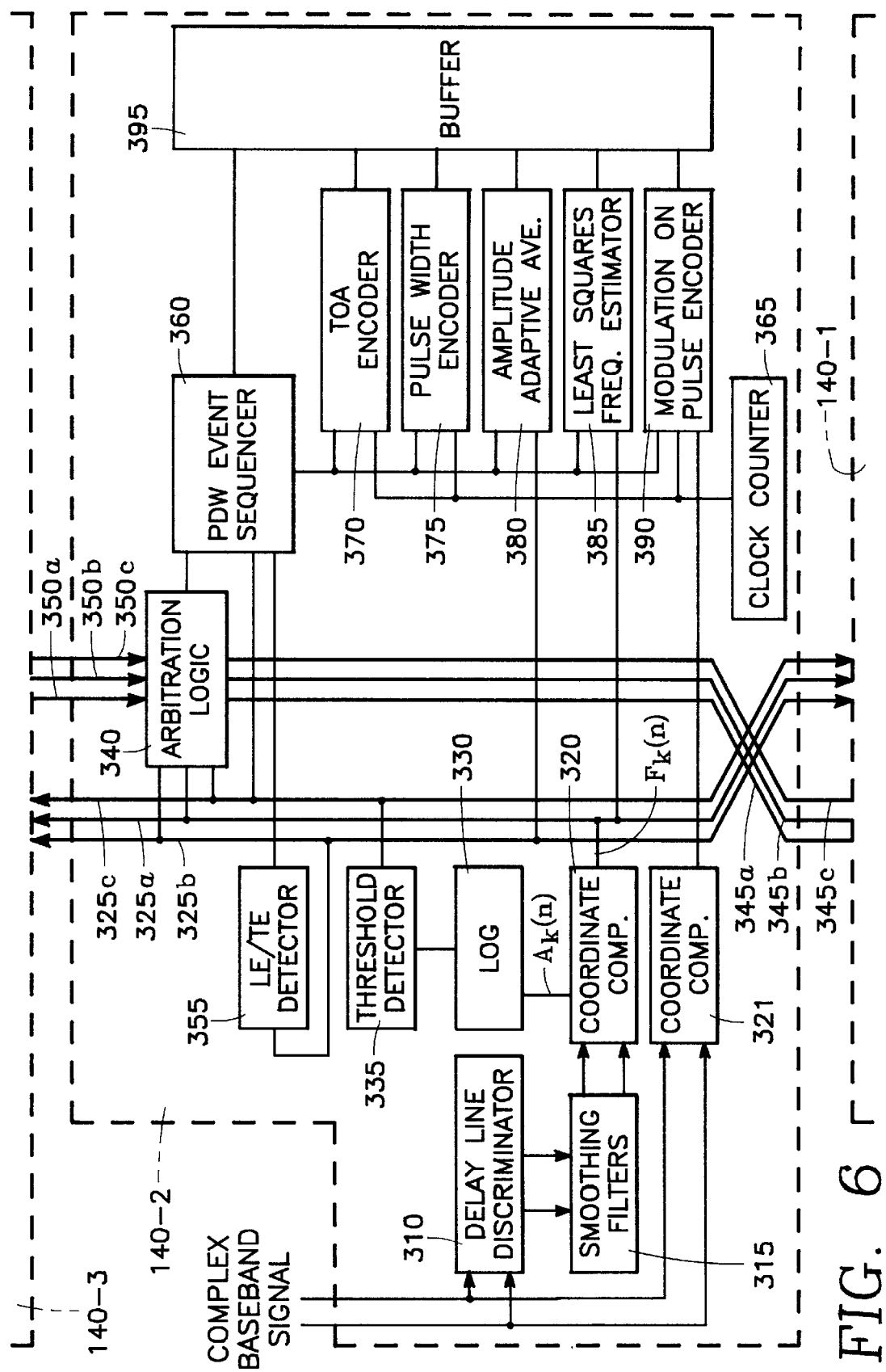
FIG. 6 is a block diagram of a channel processing module of the parameter encoder of FIG. 4.

FIG. 6 illustrates the internal structure of a typical channel processing module 140, which in the present example is the second channel processing module 140-2. The embodiment of FIG. 6 is particularly adapted to facilitate characterization of time of arrival, frequency and amplitude of a pulse signal, a continuous wave (CW) signal and an FM chirp pulse signal. In addition, for a pulse signal it is adapted to facilitate characterization of pulse width. Furthermore, for an FM chirp pulse signal it is further adapted to facilitate characterization of time rate of change of frequency and the start frequency of the chirp. However, the parameter encoder is not limited to processing those particular types of signals.

In FIG. 6, the real and imaginary components of the $n^{th}$ sample of a complex signal detected in the $k^{th}$ channel, $X_k(n)$, are applied to respective inputs of a delay line multiplier 310. (In the example of FIG. 6, the channel index k equals 2.) The delay line multiplier 310 has two M-bit inputs (where M is the number of bits of each digitized sample), one for the real part and one for the imaginary part, and performs a multiplication in the complex plane of a signal sample $X_k(n)$ by the complex conjugate of its immediate predecessor $X_k(n-1)$. (The choice of which one of the two samples is to be the complex conjugated is immaterial.) The M-bit real part and M-bit imaginary part of the resulting complex product are smoothed in a pair of conventional cascaded integrated comb (CIC) smoothing filters, denoted together by the element 315 in FIG. 6, and the smoothed M-bit real part and M-bit imaginary part are processed together by a conventional coordinate rotation digital computer 320. The coordinate rotation computer transforms the representation of the complex signal $X_k(n)$ from a sum of real and imaginary components to a polar representation of the form $Ae^{i\Phi}$, where A is the amplitude, i is $(-1)^{1/2}$, and $\Phi$ is the angle in the complex plane. Such a coordinate rotation digital computer was first developed by J. E. Voldner in 1959 and is well-known in the art. Generally, the $\Phi=\omega t+\phi$, where $\omega$ is the angular frequency of the sampled signal, t is time and $\phi$ is the phase of the sampled signal $X_k(n)$. However, because of the frequency discrimination performed by the delay line multiplier 310, the angle $\Phi$ contains only the angular frequency of the signal multiplied by a normalized sample interval time and is independent of the phase, and therefore $\Phi$ may be equated to the angular frequency $\omega$ normalized by the sampling interval. Therefore, the combined operation of the delay line multiplier 315 and the coordinate rotation computer 320 extracts the amplitude A and frequency F of the complex signal for each sample time. Thus, what is provided are the incoming signal's Fourier transform components, frequency and amplitude, for each sample time. Hereinafter, the nth sample of the amplitude A for the kth channel is referred to as $A_k(n)$ and the corresponding frequency sample is referred to as $F_k(n)$, corresponding to the channelized signal $X_k(n)$.

The coordinate rotation computer 320 outputs the M-bit frequency sample $F_k(n)$ on an output bus 325a and, through a log amplitude encoder 330, outputs the log of the amplitude $A_k(n)$ on an M-bit output bus 325b. The effect of the log amplitude encoder 330 is analogous to data compression and is well-known in the art. A threshold detector 335 receives the M'-bit output of the log amplitude encoder 330 and produces a one-bit threshold logic signal $L_{Dk}$ on an output bus 325c comparing the amplitude $A_k(n)$ with a predetermined threshold value.

Arbitration logic 340 receives the M'-bit amplitude sample $A_k(n)$, the M-bit frequency sample $F_k(n)$ and the threshold logic signal $L_{Dk}$ via the output busses 325a, 325b, 325c and receives the three corresponding outputs from the two adjacent channel processing modules. Specifically the arbitration logic 340 receives $A_{k-1}(n)$, $F_{k-1}(n)$, $L_{Dk-1}$ via input busses 345a, 345b, 345c from one neighbor and $A_{k+1}(n)$, $F_{k+1}(n)$, $L_{Dk+1}$ via input busses 350a, 350b, 350c from the other neighbor. The arbitration logic 340 arbitrates between a choice between two possible channels whenever necessary and arbitrates between frequencies whenever necessary. The arbitration logic outputs a one-bit channel arbitration logic signal $L_{CA}$ and a 3-bit frequency arbitration logic signal $F_{PDW}$.

In the remaining description, each sample, such as the real part of the signal, the imaginary part of the signal, the frequency and the amplitude are assumed to be M-bit digital words, except that the output of the log amplitude encoder 330 may be an M'-bit digital word where M' is less than M. Moreover, the logic signals mentioned below are generally single bit false/true logic signals unless otherwise specified. However, the skilled worker can implement the parameter encoder in which the number of bits may depart from the foregoing in different stages of the system without materially changing the functionality. The details given in this specification regarding the number of bits of a given variable merely facilitate a more rigorous description and are not restrictive.

A leading edge/trailing edge (LE/TE) detector 355 monitors the M'-bit amplitude sample $A_k(n)$ from the log amplitude encoder 330 outputs a one-bit logic signal (referred to herein as $L_{LE}$) signifying the arrival of a leading edge in the channelized signal and a one-bit logic signal (referred to herein as $L_{TE}$) signifying the arrival of a trailing edge in the channelized signal $X_k(n)$. A state sequencer 360 receives both logic outputs signals of the LE/TE detector 355, the logic output signal of the threshold detector 335 and the output signals of the arbitration logic 340 and processes them to produce a number of signals employed in extracting certain parameters from the signal $X_k(n)$. As will be described in greater detail below, the state sequencer 360 produces certain logic signals signifying when a leading or trailing transition of a received pulse in the channelized signal $X_k(n)$ is at certain predetermined fractions of the steady state or peak pulse amplitude.

The predetermined parameters are extracted from the signal by the following elements in response to signals from the state sequencer 360 and a count from a clock counter 365: A time of arrival encoder 370 encodes the time of arrival of a pulse detected in the signal $X_k(n)$; a pulse width encoder 375 encodes the pulse width of that pulse; an amplitude adaptive averaging circuit 380 encodes an average value of the pulse's amplitude; a least squares estimator 385 encodes an estimate of the frequency; and a modulation on pulse encoder 390 classifies the type of modulation (if any) present in the detected pulse. A FIFO data buffer 395 multiplexes the outputs of the various encoders 370, 375, 380, 385, 390 into a single data stream.

Delay Line Multiplier 310

Figure 7:
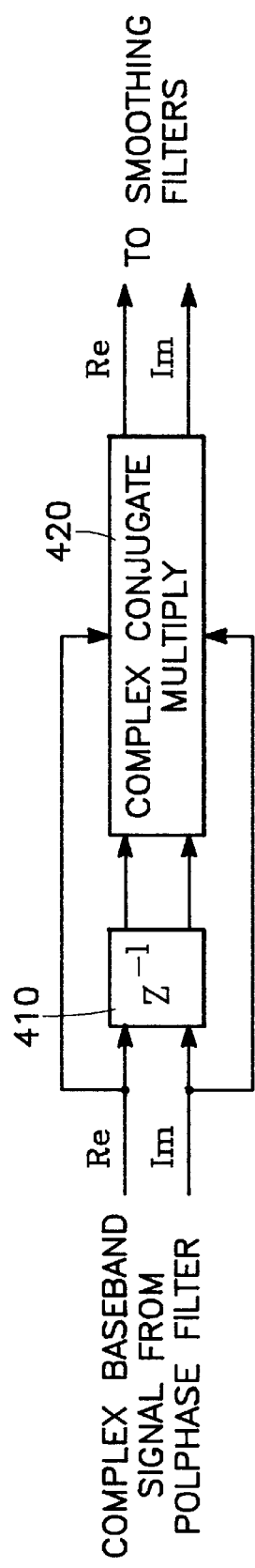
FIG. 7 is a block diagram of a delay line frequency discriminator in the channel processing module of FIG. 3.

Referring to FIG. 7, the delay-line multiplier 310 includes a one-sample-time delay line element 410 which delays in parallel the real and imaginary components of the signal $X_k(n)$. A complex conjugate multiplier 420 performs a function well-known in the art, namely the multiplication of one complex number by the complex conjugate of another complex number. As understood in this specification, a complex number is a number consisting of two components, a real component and an imaginary component. One input to the multiplier 420 is the output of the delay line element 410, namely the real and imaginary components of $X_k(n-1)$, while the other input to the multiplier 420 is the undelayed signal sample $X_k(n)$.

Threshold Detector 325

Referring to FIG. 8, the threshold detector 325 includes a conventional level comparator 510 having a pair of differential inputs labelled + and − and an output for a logic signal $L_{Dk}$. The comparator's + input receives the log amplitude $A_k(n)$ from the log encoder 330 while the comparator's − (negative) input receives one of two thresholds $V_{T1}$, $V_{T2}$ determined by a switch 520. The switch 520 selects one of the two thresholds in accordance with the logic level applied to its control input 520a from the output of the comparator 510. The switch 520 selects the higher threshold $V_{T1}$ as long as the output logic signal $L_{Dk}$ indicates that the amplitude $A_k(n)$ is below the threshold applied to the comparators − input, and selects the lower threshold $V_{T2}$ otherwise. FIG. 9 illustrates how the threshold detector 325 functions: The leading edge of a received pulse requires a higher threshold to raise the detector output while the trailing edge must fall below a lower threshold before the detector output returns to logic null. An advantage is that a received pulse can fall below its initial amplitude after occurrence of the leading edge (as suggested by the dashed line in FIG. 9) and still be detected for its entire width. Typically, for noisy pulses, both the leading and trailing edges are characterized by spikes, while the pulse amplitude can be depressed between the leading and trailing edges. As shown in FIG. 9, the higher threshold $V_{T1}$ is preferably about ⅔ of the anticipated peak amplitude of a typical pulse while the lower threshold $V_{T2}$ preferably about ⅓ of the anticipated peak amplitude.

Leading and Trailing Edge Detector 355

Referring to FIG. 10, the LE/TE detector 355 triggers a logic signal $L_{LE}$ upon the occurrence of a leading edge of a detected pulse in the channelized signal $X_k(n)$ and triggers another logic signal $L_{TE}$ upon occurrence of the trailing edge. The time of the leading edge is defined as the time at which the leading edge of a once-delayed version of the pulse coincides in amplitude with the leading edge of an undelayed attenuated version of the pulse. Similarly, the time of the trailing edge is preferably defined as the time at which the trailing edge of the pulse coincides in amplitude with the trailing edge of a twice-delayed attenuated version of the pulse. The one delay interval (D) is predetermined as slightly exceeding the typical rise-time of a suitable range of anticipated pulses. The twice delay interval (2D) is simply twice that time. In both cases, the attenuation is preferably by a factor of two. In FIG. 10, an implementation of this function delays the amplitude signal $A_k(n)$ in two successive delay lines 710, 720 so that three amplitude signals are simultaneously available: $A_k(n)$, $A_k(n-1D)$ and $A_k(n-2D)$. The first and last signals $A_k(n)$, $A_k(n-2D)$ are attenuated by a factor of two by attenuators 730, 740 and the comparators 750, 760 compare the middle signal $A_k(n-1D)$ with respective ones of the first and last signals $A_k(n)$, $A_k(n-2D)$. The output of the comparator 750 (the comparison between the middle and first signals) triggers the leading edge logic signal $L_{LE}(n)$ whenever the two inputs are at least nearly equal, while the output of the comparator 760 (the comparison between the middle and last signals) triggers the trailing edge logic signal $L_{TE}(n)$ whenever the two inputs reach at least near equality.

Arbitration Logic 340

The arbitration logic 340 may be implemented in any suitable fashion with conventional logic elements and is best defined by its truth table which can be implemented in any suitable manner by the skilled worker. The arbitration logic performs both channel arbitration and frequency arbitration, as necessary. Channel arbitration and frequency arbitration may be necessary where the frequency of a signal lies close to the frequency boundary between adjacent frequency bins or channels.

Channel Arbitration

The channel arbitration logic and function of the arbitration logic 340 is defined in the truth table of FIG. 11. Channel arbitration is necessary to resolve ambiguities which occur when signals are detected in adjacent channels due to finite channel filter skirt response. The arbitration logic 340 asserts present channel (i.e., channel k) by raising a logic output $L_{CA}$ as the valid channel of a detected pulse or signal whenever any of the eight logic test conditions defined in the truth table of FIG. 11 obtains, as follows:

(1) The first logic test condition (the column labelled $P_1$ in the truth table of FIG. 11) obtains whenever the amplitude of the present channel (channel k) exceeds the threshold $V_{T2}$ while neither of the amplitudes of its neighbor channels (channels k+1 and k−1) exceed that threshold. This is probably the least ambiguous condition for the choice of the kth channel as containing the detected pulse. (2) The second logic test condition (the column labelled $P_2$ in the truth table of FIG. 11) obtains whenever the amplitude of the present channel (channel k) and that of its neighbor (channel k+1) each exceeds the threshold $V_{T2}$ while the amplitude of the other neighbor channel k−1 does not exceed that threshold (so that the k and k+1 channels are candidates), and the amplitude of the present channel exceeds that of the neighbor k+1 (thus favoring the k channel over the k+1 channel as the likliest choice).

(3) The third logic test condition (the column labelled $P_3$ in the truth table of FIG. 11) is equivalent to the second test condition with the role of the two neighbor channels reversed. This condition obtains whenever the amplitude of the present channel (channel k) and that of its neighbor (channel k-1) each exceeds the threshold $V_{T2}$ while the amplitude of the other neighbor channel k+1 does not exceed that threshold, and the amplitude of the present channel exceeds that of the neighbor k-1.

(4) The fourth logic test condition (the column labelled $P_4$ in the truth table of FIG. 11) obtains whenever the amplitudes of the three channel (channels k-1, k and k+1) each exceeds the threshold $V_{T2}$ and the amplitude of the present channel (channel k) exceeds that of both its neighbors (channels k-1 and k+1).

(5) The fifth logic test condition (the column labelled $P_5$ in the truth table of FIG. 11) corresponds to the case where a valid pulse occurs each one of the adjacent channels k and k+1. This condition obtains whenever the amplitude of the present channel (channel k) and that of its neighbor (channel k+1) each exceeds the threshold $V_{T2}$ while the amplitude of the other neighbor channel k-1 does not exceed that threshold (so that the k and k+1 channels are candidates), the amplitude of the present channel does not exceed that of the neighbor k+1 (thus not favoring the k channel over the k+1 channel as the likeliest choice), and the frequency detected in the k+1 neighbor channel (i.e., $F_{k+1}$) differs from the frequency detected in channel k (i.e., $F_k$) by more than a certain threshold. This latter condition would indicate that the present of strong amplitudes in the two adjacent channels is not due to aliasing. The frequency difference threshold is typically a percentage of the filter or frequency bin width, for example about 10%.

(6) The sixth logic test condition (the column labelled $P_6$ in the truth table of FIG. 11) corresponds to the case of the fifth logic conditions with the roles of the neighbor channels k+1 and k-1 reversed.

(7) The seventh logic test condition (the column labelled $P_7$ in the truth table of FIG. 11) is a hybrid in which the requirements of the fourth test condition are met with respect to one of the neighbors (the k+1 channel) while the requirements of the fifth condition are met with respect to the other neighbor (the k-1 channel).

(8) The eighth logic test condition (the column labelled $P_8$ in the truth table of FIG. 11) is equivalent to the seventh condition with the roles of the neighbor channels k+1, k-1 reversed.

(9) The ninth logic test condition (the column labelled $P_9$ in the truth table of FIG. 11) corresponds to the case in which valid pulses occur concurrently in each of the three neighboring channels. This condition is met whenever all three channel amplitudes exceed the threshold, the present channel's amplitude (channel k) does not exceed those of its two neighbors (channels k-1 and k+1)—so that the fourth test condition cannot be used—and the detected frequencies in each neighbor channel i.e., $F_{k-1}$ and $F_{k+1}$) differ from the frequency detected in the present channel ($F_k$) by more than a certain threshold. This threshold is typically a percentage of the filter or frequency bin width, for example about 10%.

If any one of the nine foregoing logic test conditions is met, then the arbitration logic 340 raises its logic output bit $L_{CA}$, which asserts the present channel (channel k) as containing a valid pulse. Otherwise, the logic output bit $L_{CA}$ is not raised.

Frequency Arbitration

Frequency arbitration is necessary to resolve frequency measurement ambiguities arising from the sample rate decimation and spectral folding which occurs in the digital channelizer. Such a correction moves a frequency aliased at one edge of the filter band to the opposite edge. The frequency is corrected by either adding or subtracting a frequency corresponding to the channel bandwidth, depending upon the location of the detected frequency. FIG. 12 illustrates the truth table defining the logical function of the frequency arbitration. There are three possible outcomes: (a) the frequency does not require correction, (b) one channel bandwidth is added to the detected frequency, (c) one channel bandwidth is subtracted from the detected frequency. This outcome can be unambiguously specified by three logic bits. Alternatively, the output can simply be an entire byte representing the corrected frequency. There are two test cases in the truth table of FIG. 12 in which the frequency is corrected, corresponding to the columns labelled $P_1$ and $P_2$. These test cases make use of two defined quantities, namely $F_{LO}$ and $F_{HI}$, which are, respectively, the lowest and highest frequencies of the channel for which the filter response has not rolled off below a predetermined amount (e.g., zero). FIG. 5 illustrates examples of the locations of $F_{LO}$ and $F_{HI}$ in a channel frequency band.

In the first test case ($P_1$), the detected frequency is not below $F_{LO}$ but is above $F_{HI}$, the amplitudes of both adjacent channels (the k-1 and k+1 channels) are above a threshold (such as $V_{T2}$) and the amplitude in channel k-1 exceeds that of channel k+1. In this case, it appears that the frequency has been aliased from the lower edge to the upper edge of the channel band, and therefore one channel bandwidth is subtracted from the detected frequency to bring it back to near the lower edge of the channel band.

In the second test case ($P_2$), the detected frequency is below $F_{LO}$ and (therefore) is not above $F_{HI}$, the amplitudes of both adjacent channels (the k-1 and k+1 channels) are above a threshold (such as $V_{T2}$) and the amplitude in channel k+1 equals or exceeds that of channel k-1. In this case, it appears that the frequency has been aliased from the upper edge to the lower edge of the channel band, and therefore one channel bandwidth is added to the detected frequency to bring it back to near the upper edge of the channel band.

If neither of these two test cases is met, then no correction is made to the detected frequency.

The skilled worker can readily construct a logic circuit implementing the truth tables of FIGS. 8 and 9 independently of any particular logical circuit implementation of these functions, and therefore no such implementations are discussed herein.

State Sequencer 360

Figure 13:
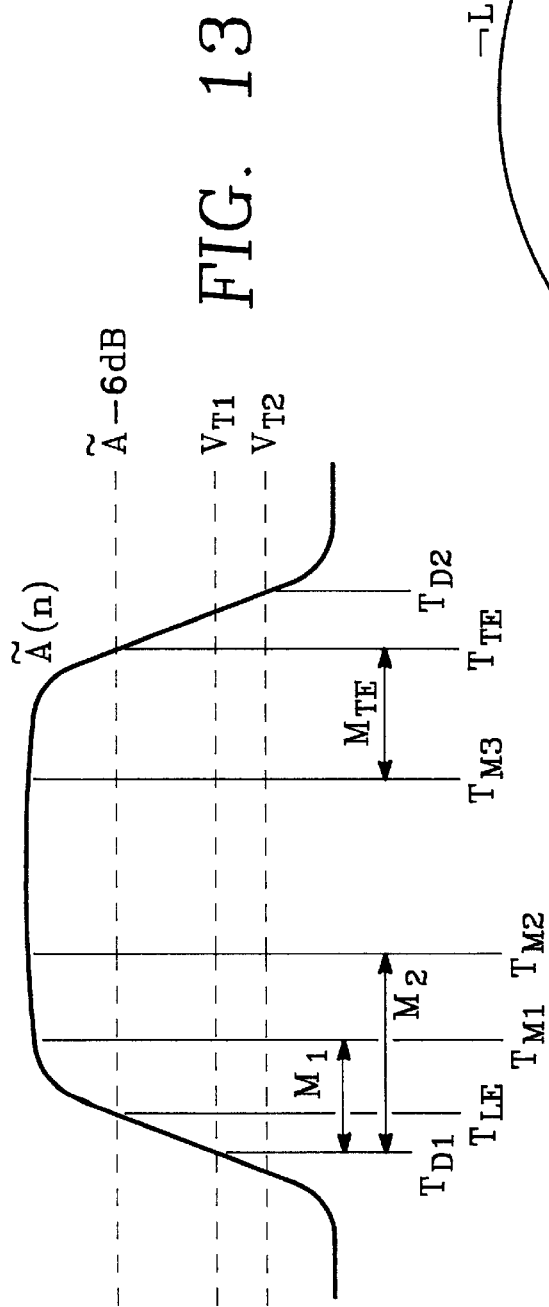
FIG. 13 illustrates the time domain waveform of an incoming pulse and defines several key events and time intervals controlling the state sequencer in the channel processing module of FIG. 6.

The state sequencer 360 responds to the occurrence of certain events which are illustrated in FIG. 13. FIG. 13 illustrates the time domain waveform of a typical pulse detected in the channelized signal. The first event occurs at time $T_{D1}$ when the pulse amplitude reaches the value of the higher threshold $V_{T1}$ of the threshold detector. This event is signaled by the transition of the threshold detector logic output $L_D$ from a logic zero to logic one. The next event occurs at time $T_{LE}$, when the LE/TE detector 355 detects the leading edge of the pulse. This event is signified by the transition of the leading edge logic signal $L_{LE}$ of the LE/TE detector from logic zero to logic one. Next, the pulse reaches 95% of its peak amplitude at time $T_{M1}$, which is signified by the transition of a logic signal $L_{M1}$, produced by the arbitration logic 340 from zero to logic one. Then, the pulse reaches 99% of its peak amplitude at time $T_{M2}$, which is signified by a transition of a logic signal $L_{M2}$ from zero to logic one. This logic signal controls the sequencing of the parameter encoder, the least squares frequency estimator and the amplitude averager. The time interval between $T_{M1}$ and $T_{D1}$ is $M_1$ and the time interval between $T_{M2}$ and $T_{D1}$ is $M_2$.

While the foregoing events occur near the leading edge, the remaining events occur near the trailing edge. At time $T_{M3}$ the pulse amplitude falls below 95% of its peak value. At time $T_{TE}$ the LE/TE detector detects a trailing edge, so that the logic signal output by the LE/TE detector transitions from zero to logic one. The time interval between time $T_{M3}$ and time $T_{TE}$ is $M_{TE}$. The last event occurs at time $T_{D2}$ when the amplitude falls below the lower threshold $V_{T2}$, which causes the logic signal $L_D$ to transition from logic one to zero.

Figure 14:
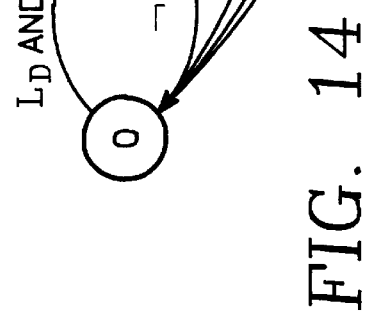
FIG. 14 is a state transition diagram illustrating the operation of the state sequencer in the channel processing module of FIG. 6.

Referring to FIG. 14, the sequence of states by the state sequencer 360 characterizes the transitions of certain logic signals. Specifically, the transitions of the logic signals $L_D$ and $L_{LE}$ are the transition of the system from the quiescent ground state 0 to state 1. In state 1, the system strobes the clock signal to mark the pulse time of arrival and the beginning of pulse (as discussed below in this specification), and initiates timers for $T_{M1}$ and $T_{M2}$. The transition of the logic signal $L_{M2}$ is the transition of the system from state 1 to state 2. In state 2, the system activates the channel arbitration logic function of the arbitration logic 340 and measures the amplitude and frequency. The transition of the logic signal $L_{CA}$ to a true logic level is the transition from state 2 to state 3. Failure of the $L_{CA}$ logic signal to transition to the true logic level indicates that the detected pulse is not in the present channel, and the system jumps instead to state 5, whence it returns to state 0. Otherwise, the logic signal $L_{M2}$ transitions during state 3. In state 3, amplitude and frequency measurements are made. At the end of the detected pulse, the logic signal $L_{TE}$ transitions to a logic one while the logic signal $L_D$ returns to a logic zero, these transitions carrying the system from state 3 to state 4. However, if there is no end-of-pulse before a predetermined timer interval (equal to at least the longest anticipated valid pulse width), then the sequencer 360 triggers a logic signal $L_{CW}$, indicating that the received signal probably is not a pulse train but rather a continuous wave (CW) signal, in which case the system returns to the ground state (state 0). On the other hand, if the system reaches state 4, the clock is strobed to mark the end of pulse, and the transfer of the parameter digital work is initiated. The system then returns to the ground state, state 0.

The logic signals mentioned above not produced by other components are produced by the state sequencer 360 in accordance with the foregoing using conventional techniques including well-known logic functions.

Time of Arrival Encoder 370

Figure 15:
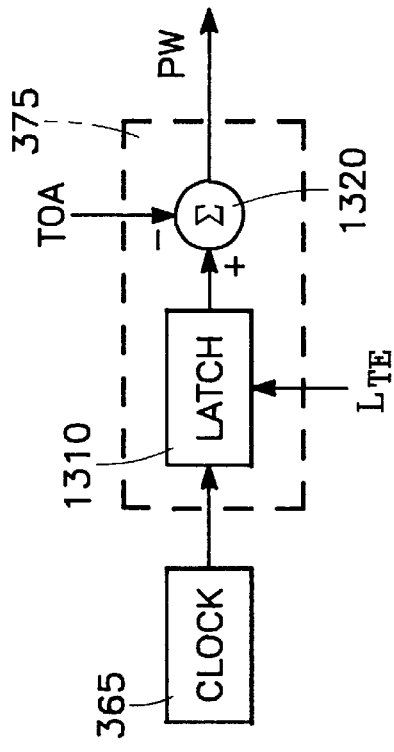
FIG. 15 is a block diagram of a time of arrival encoder in the channel processing module of FIG. 6.

Referring to FIG. 15, the time of arrival encoder 370 consists of a latch 1210. The latch 1201 has a data input connected to the clock 365, a latch control input connected to the logic signal $L_{LE}$ from the LE/TE detector 355, and a data output which provides the time of arrival for the pulse detected by the LE/TE detector. Whenever the leading edge logic signal $L_{LE}$ becomes true, the current value of the clock signal is latched at the output of the time of arrival encoder 370.

Pulse Width Encoder 375

Figure 16:
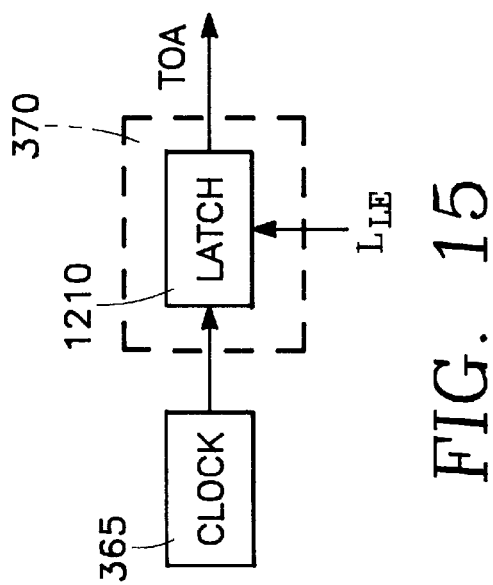
FIG. 16 is a block diagram of a pulse width encoder in the channel processing module of FIG. 6.

Referring to FIG. 16, the pulse width encoder 375 consists of a latch 1310 and a subtractor 1320. The data input to the latch receives the clock signal from the clock 365 while the data output of the latch 1310 is applied to a positive input of the subtractor 1320. The latch 1310 has a latch control input connected to the trailing logic signal $L_{TE}$ from the LE/TE detector 355. The subtractor 1320 has a negative input connected to receive the time of arrival from the output of the time of arrival encoder 365. The subtractor 1320 subtracts the time of arrival from the value of the clock signal latched at the time of the trailing edge from the time of arrival received from the time of arrival encoder 365. The difference is the pulse width, and is output from the pulse width encoder 375.

Adaptive Averaging Circuit 380

Figure 17:
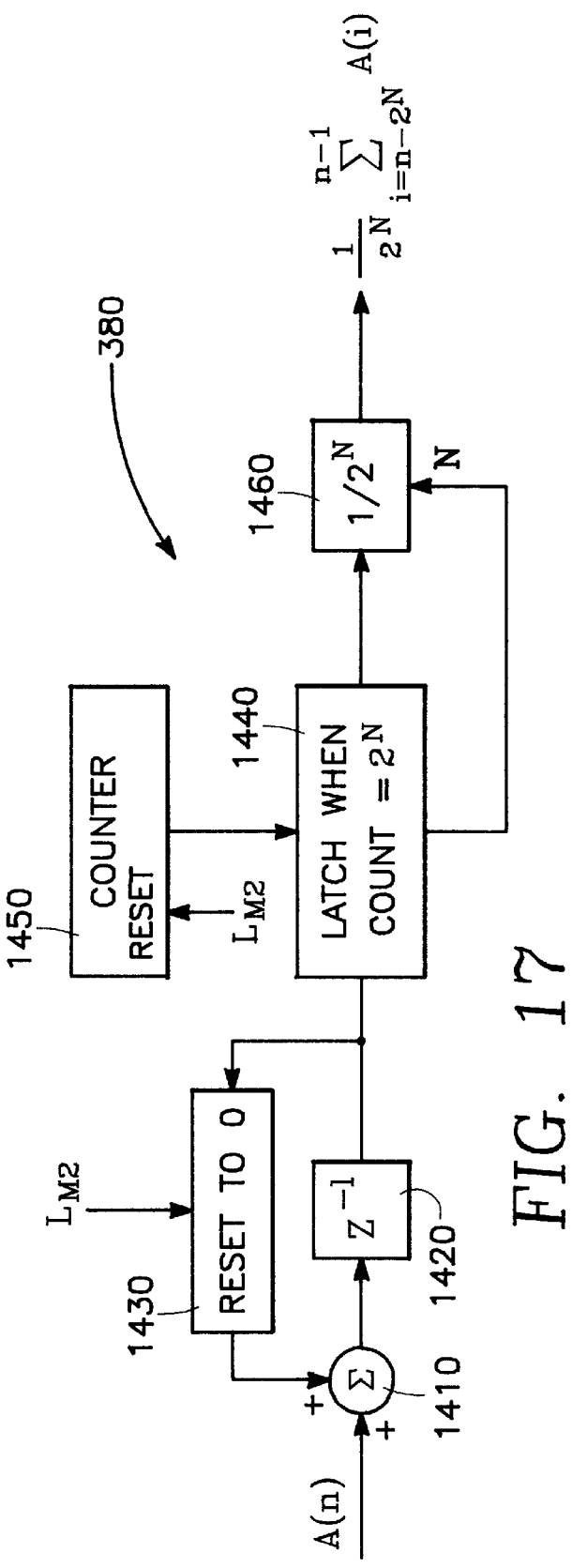
FIG. 17 is a block diagram of an amplitude averager in the channel processing module of FIG. 6.

Referring to FIG. 17, the amplitude adaptive averaging circuit receives from the log amplitude encoder 330 a signal amplitude A(n) at each sample time n. An adder 1410 has one input connected to receive the succession of A(n)'s. The output of the adder 1410 is delayed one sample time by a delay element 1420. The output of the delay element 1420 is applied as feedback to other input of the adder 1410 through a buffer 1430, so that a cumulative sum may be computed. The buffer 1430 is controlled by the logic signal $L_{M2}$ from the sequencer 360 to reset the feedback to zero with each transition of the logic signal $L_{M2}$ to a true logic value. Thus, the summation carried out with the adder 1410 begins only after the amplitude values have reached 95% of the peak value. A latch 1440 latches the delayed sum from the delay element 1420 counter 1450 each time the output from a counter 1450 reaches a power of 2. The counter 1450 is reset by the logic signal $L_{M2}$ so as to be synchronized with the operation of the summing loop 1410, 1420, 1430. In operation, the latch 1440 is a logic circuit that is set to a power of 2, namely $2^N$, where N is an integer, and the latch waits until the output from the counter 1450 reaches $2^N$, at which time it latches at its output the delayed sum from the delay element 1420. The latch 1440 then updates N to the next highest integer value and repeats the operation. Each current value of N is output by the latch 1440 to a divide-by-$2^N$ circuit 1460, which divides the latched sum value by $2^N$ and provides the result at the output of the adaptive averaging circuit 380. The result is a sum over $2^N$ samples of the amplitude divided by $2^N$, which is the average value desired.

The main advantage of the averaging circuit 380 is that it attempts to compute an average amplitude only when the number of available amplitude samples reaches a power of two ($2^N$) thereby making the divide-by-$2^N$ operation a simple binary shift, so that no floating point arithmetic is necessary.

Least Squares Frequency Estimator 385

Figure 18:
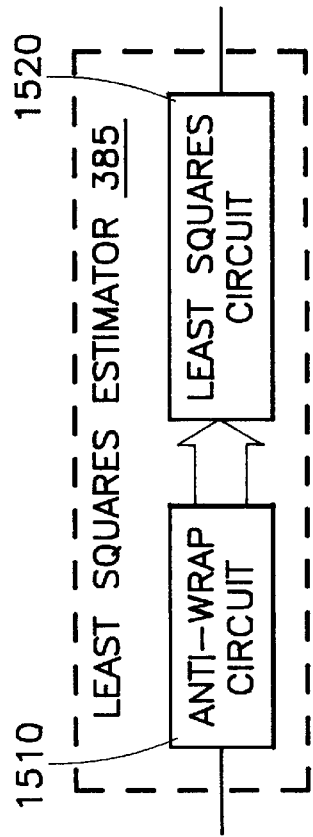
FIG. 18 is a top-level block diagram of a least squares frequency estimator in the channel processing module of FIG. 6.

Referring to FIG. 18, the frequency estimator 385 includes an anti-wrap circuit 1510 which processes the incoming polar coordinate or frequency-containing signal $\omega t+\phi$ (where $\omega$ is the angular frequency and $\phi$ is the phase) from the coordinate rotation computer 320. The frequency estimator further includes a least squares circuit 1520 connected to the output of the anti-wrap circuit 1510. The frequency containing signal ($\omega t+\phi$) can cause aliasing when ($\omega t+\phi$) is near $\pm\rho$, giving rise to instability. The anti-wrap circuit 1510 removes such instability.

Figure 19:
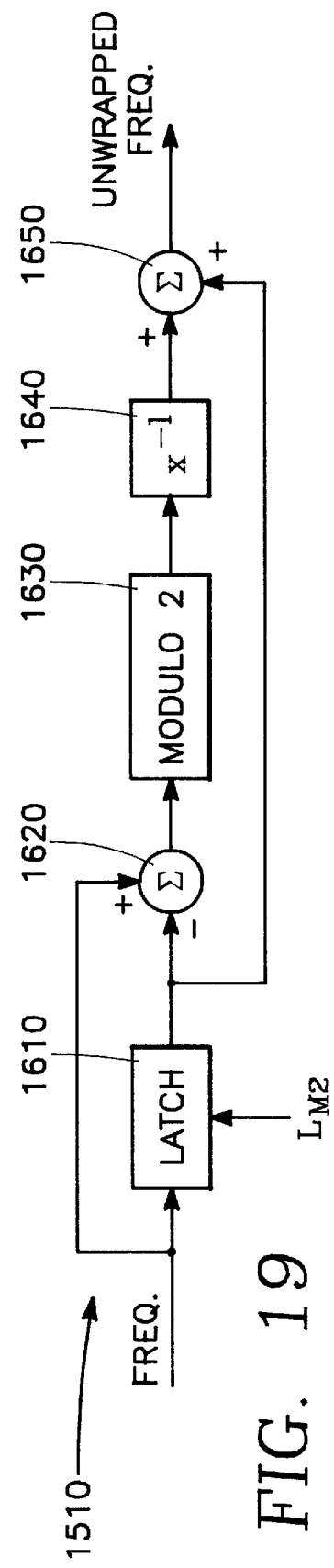
FIG. 19 is a block diagram of an anti-wrap circuit of the least squares frequency estimator of FIG. 18.

Referring to FIG. 19, the anti-wrap circuit 1510 consists of a latch 1610 which latches the incoming frequency-containing signal each time the logic signal $L_{M2}$ is true (i.e., when an incoming pulse reaches 95% of its peak value), and applies the latched signal to the negative input of a subtractor 1620. The unlatched frequency-containing signal is applied to the positive input of the subtractor 1620. The subtraction of successive samples of the frequency-containing signal ωt+φ eliminates the relatively constant phase φ, leaving only successive samples of the frequency ω, and thereby performs delay line discrimination of the frequency. The output of the subtractor 1620 is reduced modulo 2 by a modulo 2 circuit 1630 whose output is applied through a one-sample delay element 1640 to one input of an adder 1650. The other input of the adder 1650 receives the latched frequency-containing signal from the latch 1610. The output of the adder 1650 is a signal which is a function of successive samples of the unwrapped frequency, and is applied to the input of the least squares circuit 1520.

Least Squares Circuit 1520

Figure 20:
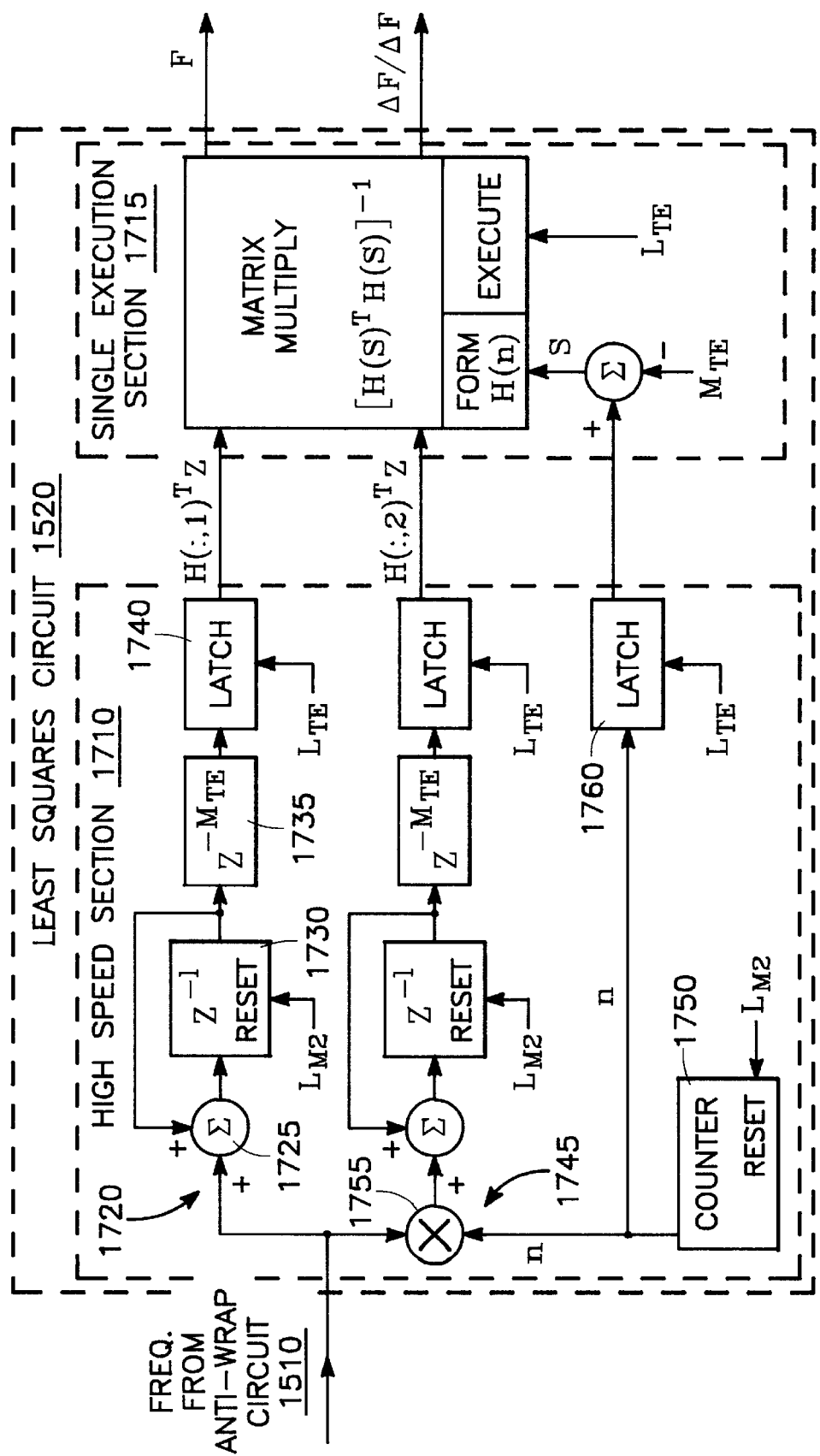
FIG. 20 is a block diagram of a least squares circuit of the least squares frequency estimator of FIG. 18.

Referring to FIG. 20, the least squares circuit 1520 consists of a high speed section 1710 and a single execution section 1715. The implementation of FIG. 20 is particularly adapted to estimating the frequency of an FM chirp pulse signal. In the case of an FM chirp, the subtraction performed by the discriminator section 1610, 1620 of FIG. 19 yields the following discriminated frequency z(n) for the nth sample (ignoring noise terms):

$$z(n) = F_0 T + (dF/dt)/2 + (dF/dt)T^2 n^2/2 \qquad (1)$$

where $F_0$ is the starting frequency of the FM chirp, dF/dt is the rate of change of the frequency during the FM chirp, T is the sample interval, or the reciprocal of the sampling rate and n is the sample index. If there are S successive samples of a given pulse to be processed, then z(k) may be represented as an S-element column vector whose elements are each of the z(n) in descending order of sample number n. In this case, the right side of the foregoing equation is of the form Hx, where H is a 2-by-S matrix and x is a 2-element column vector as follows:

$$x = \begin{vmatrix} T & -T^2/2 \\ 0 & T^2 \end{vmatrix} \begin{vmatrix} F_0 \\ dF/dt \end{vmatrix} \qquad (2)$$

$$H = \begin{vmatrix} 1 & 1 \\ 1 & 2 \\ 1 & 3 \\ . & . \\ . & . \\ . & . \\ 1 & S \end{vmatrix} \qquad (3)$$

In accordance with conventional techniques, an estimate $z_{LS}$ of z over the S samples which minimizes the squares of the deviations between the estimate and the true (but a priori unknown) values for the n samples is obtained by performing the following operation:

$$z_{LS} = (H^T H)^{-1} H^T z \qquad (4)$$

where the superscript denotes a transpose and the superscript $^{-1}$ denotes an inverse. The term $H^T z$ is a 2-element vector which may be expressed as follows:

$$H^T z = \begin{vmatrix} \Sigma z(n) \\ \Sigma n z(n) \end{vmatrix} \qquad (5)$$

The term $(H^T H)^{-1}$ is a 2-by-2 matrix whose elements are functions of the number of samples n as follows:

$$(H^T H)^{-1} = [1/(S(S-1))] \begin{vmatrix} 2(2S+1) & -6 \\ -6 & 12(2S+1) \end{vmatrix} \qquad (6)$$

Thus, the least squares estimate of z over S samples is as follows:

$$z_{LS} = [1/(S(S-1))] \begin{vmatrix} 2(2S+1) & -6 \\ -6 & 12(2S+1) \end{vmatrix} \begin{vmatrix} \Sigma z(n) \\ \Sigma n z(n) \end{vmatrix} \qquad (7)$$

where the symbol Σ denotes a summation over the index n from n=1 to n=S.

The circuit of FIG. 20 performs the operation of the right side of the foregoing equation in synchronism with the logic sequence signals from the state sequencer 360, as will now be described. The high speed section 1710 of FIG. 20 forms the 2-element vector of Equation (5) and the single execution section 1715 forms the matrix operator of Equation (6) and then performs the matrix multiply operation of Equation (7).

The term Σz(n) (the top element of the 2-element vector defined by Equation (5)) is computed in the high speed section 1710 by a first branch 1720 consisting of an adder 1725 having one input receiving the frequency sample $F_k(n)$ (corresponding to z(n) of Equations 5–7), a one sample time delay 1730 connected between the output of the adder 1725 and the other input of the adder 1725, a delay 1735 of the time duration $M_{TE}$ (defined in FIG. 13 and output by the state sequencer 360) connected between the output of the delay 1730 and a latch 1740. The loop formed by the adder 1725 and the delay element 1730 performs the summation operation Σz(n). The contents of the one-sample time delay or buffer 1730 is initialized to zero by the logic signal $L_{M2}$ (i.e., when the pulse amplitude first reaches 99% of its peak amplitude) to begin the summing process. The summing process is terminated by the latch 1740 latching the delayed sum with the logic signal $L_{TE}$ (i.e., at the end of the pulse). The delay of $M_{TE}$ imposed by the delay element 1735 stores the samples before the trailing edge of the pulse so that the sum is not distorted by the trailing edge. The output of the latch 1740 is the term Σz(n) of Equation (5).

The term Σnz(n) (the bottom element of the 2-element vector defined by Equation (5)) is computed in the high speed section 1710 by a second branch 1745 similar to the first branch 1720 and consisting of an adder 1725' having one input receiving the frequency sample $F_k(n)$ (i.e., z(n) of Equations 5–7) multiplied by n (by a multiplier 1750), where n is the output of a counter 1755. The second branch 1745 further includes a one sample time delay 1730' is connected between the output of the adder 1725' and the other input of the adder 1725', a delay 1735' of the time duration $M_{TE}$ (defined in FIG. 13 and output by the state sequencer 360) connected between the output of the delay 1730' and a latch 1740'. The multiplier 1750 multiplies each frequency sample z(n) by the output of a counter 1755, and the product is applied to an input of the adder 1725'. The counter 1755 is initialized by the logic signal $L_{M2}$ to synchronize the sample index n from the counter 1755 with the summation process Σnz(n) performed by the loop consisting of the adder 1725' and the delay element 1730'. The contents of the one-sample time delay or buffer 1730' is initialized to zero by the logic signal $L_{M2}$ (i.e., when the pulse amplitude first reaches 99% of its peak amplitude) to begin the summing process. The summing process is terminated by the latch 1740' latching the delayed sum with the logic signal $L_{TE}$ (i.e., at the end of the pulse). The delay of $M_{TE}$ imposed by the delay element 1735' stores the samples before the trailing edge of the pulse so that the sum is not distorted by the trailing edge. The output of the latch 1740' is the term Σnz(n) of Equation (5).

In forming the matrix operator of Equation (6), the single execution section 1715 must first know the value of S (i.e., the number of samples over which the summations $\Sigma z(n)$ and $\Sigma nz(n)$ were carried out by the top and bottom branches 1720, 1745 of the high speed section 1710). The value of S is obtained by a latch 1760 which latches the output of the counter 1750 simultaneously with the latches 1740, 1740' by the logic signal $L_{TE}$ at the pulse trailing edge. In addition, a subtractor subtracts the time delay $M_{TE}$ from the output of the latch 1760, this subtraction corresponding to the time delays 1735, 1735' of the two branches. The difference is the value of S and is applied to one input of the high speed section 1715. The high speed section 1715 substitutes this value of S into Equation (6) to generate the matrix operator of Equation (6). Then upon the transition (to true) of the logic signal $L_{TE}$ (i.e., upon completion of the summation processes in the high speed section 1710), the single execution section 1715 multiplies the matrix operator of Equation (6) by the vector of Equation (5) to produce the two-element vector defined by Equation (7). The top element of the vector is the least squares estimate of the frequency while the bottom element of the vector is the least squares estimate of the time rate of change of the frequency dF/dt. If the received pulse has no FM modulation or chirp, then this second vector element is zero.

Modulation on Pulse Encoder 390

The modulation on pulse encoder 390 plays a major role in the characterization of the modulation present in the received signal. The types of modulation which the modulation on pulse encoder can identify include frequency modulation (FM), phase modulation and FM chirp. An FM chirp is a pulse containing a constantly changing frequency. The modulation pulse encoder 390 distinguishes between phase modulation and frequency modulation based upon the length of "chips" in the frequency of the received signal. A chip in a frequency versus time graph of the signal is analogous to a pulse in an amplitude versus time graph of the signal. A signal predominantly characterized by relatively short chips contains phase modulation, while a signal with relatively long duration chips is either FM or FM chirp. The dF/dt term output by the estimator 1520 differentiates between FM and FM chirp.

Figure 21:
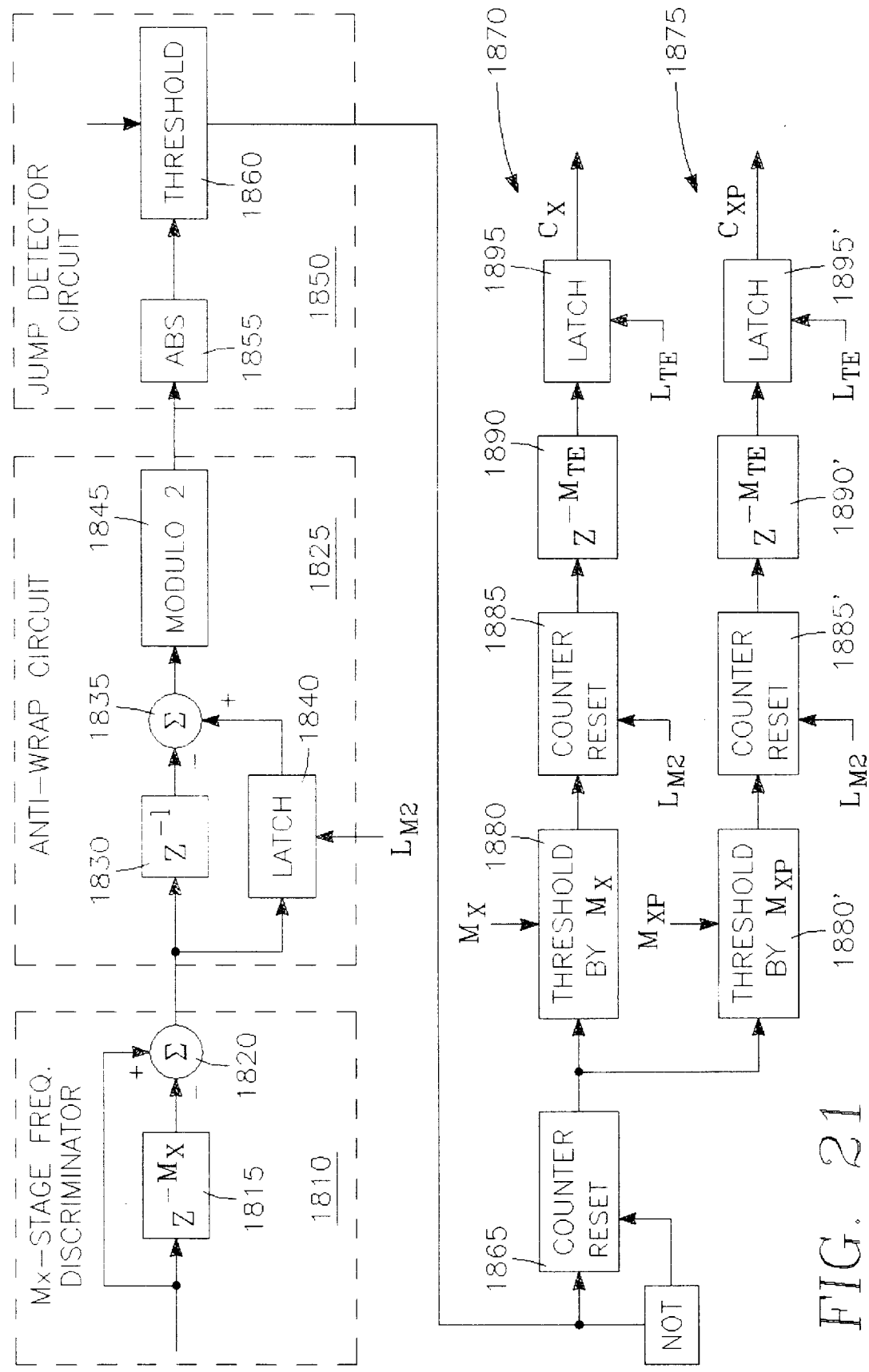
FIG. 21 is a block diagram of a modulation on pulse identifier in the channel processing module of FIG. 6.

FIG. 21 illustrates the modulation on pulse encoder 390. In order to carry out the foregoing discrimination between frequency modulation (FM), FM chirp and phase modulation, the frequency information is extracted by a delay line frequency discriminator 1810 consisting of a delay element 1815 and a subtractor 1820. The input to the frequency discriminator 1810 preferably is the angle polar coordinate ($\Phi$) output of a coordinate transform computer 321 identical to the coordinate transform computer 320 discussed above with reference to FIG. 6. However, the real and imaginary inputs to the transform computer 321 is the channelized signal real and imaginary parts unprocessed by the multiplier 310 and unprocessed by the smoothing filter 315.

One input of the subtractor 1820 receives the current signal sample while the other receives a signal sample delayed by a delay time Mx. Mx is the shortest time duration of a chip that would signify phase modulation in a frequency range of interest, and is best determined by the user for a particular application. The output of the subtractor 1820 provides the frequency of the received signal. Preferably, an anti-wrap circuit 1825 is provided at the output of the discriminator 1810 in order to reduce or eliminate instabilities in the frequency samples output by the discriminator 1810. An anti-wrap circuit is described above in this specification with reference to FIG. 19, and the anti-wrap circuit 1825 of FIG. 21 has some of the elements of the anti-wrap circuit of FIG. 19. The anti-wrap circuit 1825 of FIG. 21 includes a one-sample time delay element 1830 which delays the frequency sample applied to the negative input of a subtractor 1835. A latch 1840 latches the frequency sample at the time of the logic signal $L_{M2}$ (i.e., when the pulse first stabilizes near 99% of its peak value). The subtractor 1835 outputs the difference between this initial "stable" sample and each successive sample. Assuming that the sample frequency is an angular frequency in radians normalized to $\rho$ and one sample time period, frequency wrapping can occur as the frequency changes by a factor of 2. Therefore, reducing the output of the subtractor 1835 by a modulo 2 element 1845 prevents frequency wrapping.

A jump detector circuit 1850 has a conventional absolute value circuit 1855 which computes the absolute value the difference value output by the anti-wrap circuit 1825 and a threshold circuit which outputs a logic signal which is true during each sample time that the absolute value output of the absolute value circuit jumps by a predetermined amount (e.g., by ¼) from a steady state value indicative of a frequency chip. The time-duration or width of each chip is determined by a counter 1865 which a constantly reset to zero except when the output of the threshold circuit 1860 is true. For this purpose, a NOT gate 1870 can be connected between the counter's input and reset terminals.

The number of chips of duration exceeding Mx is determined in a first branch 1870 while the number of chips of duration exceeding a longer time, Mxp, is determined in a second branch 1875. In the first branch 1870, a count thresholder 1880 holds its output high as long as the output of the counter 1865 exceeds Mx. The number of transitions in the output of the thresholder is counted by a counter 1885. The output of the counter 1885 is delayed in a delay element 1890 by the time interval $M_{TE}$ defined by the sequencer 360. The output of the delay element 1890 is latched at a latch 1895 at the pulse trailing edge by the end of pulse logic signal $L_{TE}$. The output of the latch 1895 is the number of frequency chips of durations exceeding Mx.

In the second branch 1875, a count thresholder 1880' holds its output high as long as the output of the counter 1865 exceeds the long time duration Mxp. The number of transitions in the output of the thresholder 1880' is counted by a counter 1885'. The output of the counter 1885' is delayed in a delay element 1890' by the time interval $M_{TE}$ defined by the sequencer 360. The output of the delay element 1890' is latched at a latch 1895' at the pulse trailing edge by the end of pulse logic signal $L_{TE}$. The output of the latch 1895' is the number of frequency chips of durations exceeding Mxp.

Figure 22:
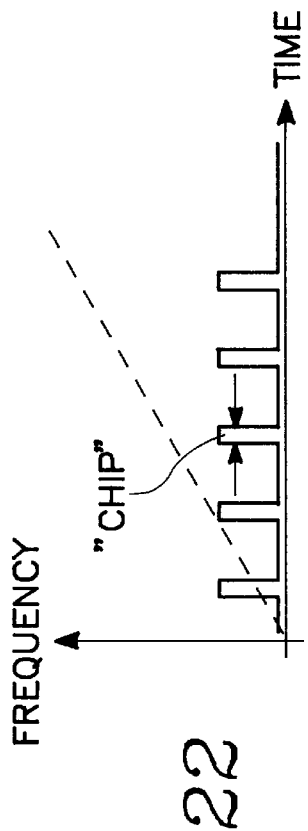
FIG. 22 is a graph illustrating the behavior of the measured frequency as a function of time in the presence of phase modulation (solid line) and frequency modulation or FM chirping (dashed line).

The graph of FIG. 22 illustrates how the sampled frequency behaves as a function of time in the presence of phase modulation (solid line curve) and in the presence of FM chirp modulation (dashed line). Phase modulation produces many frequent chips (pulses in the frequency) of short duration, while FM modulation and FM chirp modulation produce long chips. The parameter digital word data buffer 395 of FIG. 6 and the parameter digital word interface 150 of FIG. 1 together can compare Cx, the number of chips longer than Mx, and Cxp, the number longer than Mxp, in order to determine whether there is phase modulation. If Cxp is significantly greater than |Cxp−Cx|, then there is either FM modulation or FM chirp modulation. Whether it is FM or FM chirp is determined by inspecting the dF/dt term at the output of the estimator 385. On the other hand, if the opposite is true (i.e., |Cx−Cxp| is greater than Cxp), then there is phase modulation. The parameter digital word interface provides indication that the received signal is a continuous wave signal upon assertion of the logic signal $L_{CW}$ by the state sequencer 360 as described previously.

In summary, the system classifies a received signal as either CW or not CW (i.e., a pulse) by the state of the logic signal $L_{CW}$. If it is CW, then the system provides an estimate of the frequency, amplitude and time of arrival. If it is a pulse, then the system further provides the pulse width and identifies the type of modulation (if any) contained in the pulse. The types of modulation which the system can identity include frequency modulation, phase modulation and FM chirp modulation. If the pulse has FM chirp modulation, then the system further provides the time rate of change of the chirp frequency and the starting frequency of the chirp.

While the invention has been described in detail by specific reference to preferred embodiments, it is understood that variations and modifications thereof may be made without departing from the true spirit and scope of the invention.

What is claimed is:

1. A digital direction finding receiver having N frequency channels spanning a frequency band of said receiver, said receiver capable of receiving signals simultaneously from a plurality of antennas spaced from one another, one of said antennas comprising a reference location antenna, said receiver comprising:

a plurality of analog-to-digital converters having their analog inputs connected to respective ones of said antennas;

a reference source capable of outputting a reference digital signal containing at least a local frequency component within a selected one of said N frequency channels;

a plurality of digital down converter modules, each one of said digital down converter modules having a reference input connected to said reference source and a signal input connected to the digital output of a respective one of said analog-to-digital converters, each said digital down converter modules comprising a multiplier for producing at an output of said digital down converter a product of said reference signal and the signal from the respective one of said antennas; and a digital phase detector having plural phase detector signal inputs connected to the outputs of remaining ones of said digital down converters, said phase detector detecting phase angles of signals on each of said phase detector signal inputs relative to a corresponding signal received at said reference antenna.

2. The receiver of claim 1 wherein said reference signal source comprises:

a digital local oscillator capable of outputting a digital local oscillator signal as said digital reference signal having a local oscillator frequency within a selected one of said N frequency channels.

3. The receiver of claim 2 wherein said local oscillator frequency is a center frequency of the selected one of said N frequency channels.

4. The receiver of claim 2 wherein said phase detector further comprises a phase detector reference input connected to the digital down converter output corresponding to said reference antenna and wherein said phase detector senses phase differences between its reference input and each of its signal inputs.

5. The receiver of claim 1 wherein reference signal source comprises:

memory apparatus capable of receiving and storing digital signals of successive samples of N parallel channelized signals of said N frequency channels;

switch apparatus capable of selecting from said memory apparatus the one digital signal corresponding to the selected one of said frequency channels and applying said one digital signal as said reference signal to said local oscillator input of each of said digital down converter modules.

6. The receiver of claim 5 wherein each of said digital down converters corresponds to one of said antennas except said reference antenna.

7. The receiver of claim 5 wherein said phase detector constitutes a coordinate transformer capable of extract the phase angle of the output of each of said digital down converters.

8. The receiver of claim 5 wherein each said memory apparatus comprises a first-in-first-out memory.

9. The receiver of claim 1 wherein each of said digital down converter modules comprises a memory capable of storing a signal from the corresponding analog-to-digital converter and outputting the signal so stored in synchronism with said reference signal from said reference signal source.

10. The receiver of claim 9 wherein each said memory comprises a first-in-first-out memory.

11. The receiver of claim 9 further comprising a controller responsive to identification of one or more of said N frequency channels and capable of storing the identity of said one or more frequency channels and causing said reference signal source to output the corresponding reference signals in succession and causing said memory of each of said digital down converters to repeat its stored signal in synchronism with said succession of corresponding reference signals, whereby said phase detector measures a phase angle for each signal arriving in a respective channel concurrently.

12. The receiver of claim 5 further comprising:

a digital channelizer having its digital input connected to the digital output of the analog-to-digital converter of said reference antenna and having N channelized digital outputs corresponding to said N frequency channels and having said N channelized signals.

13. The receiver of claim 1 wherein each of said digital down converters further comprises a low pass filter at the output of the multiplier of said digital down converter.

14. The receiver of claim 4 wherein said phase detector comprises a phase detector multiplier connected to said phase detector reference input and a corresponding one of said phase detector signal inputs, a low pass filter at the output of said phase detector multiplier and a coordinate transformer for extracting a phase angle from the output of said low pass filter.

15. The receiver of claim 1 further comprising detection and arbitration logic for selecting one or more of said channels by determining which of said channels contain valid signals.

16. The receiver of claim 15 wherein said detection and arbitration logic comprise:

a leading edge detector; and a channel arbitrator for resolving ambiguities between channels.

17. A parameter encoder system including a direction finding receiver capable of receiving signals simultaneously from a plurality of antennas spaced from one another including a reference location antenna, for identifying selected parameters including angle of arrival of a digitally sampled incoming signal lying within a receiver bandwidth, wherein said receiver bandwidth is divided into plural contiguous frequency channels, each channel having a channel bandwidth, whereby said incoming signal is divided into plural channelized signals lying in respective ones of said plural frequency channels, said parameter encoder comprises plural channel processors connected to receive respective ones of said channelized signals, each of said channel processors comprising:

Fourier transform means for producing a frequency value and an amplitude value for each sample of the respective channelized signal;

a channel arbitrator comprising:

comparator means for comparing said amplitude value with a predetermined threshold, comparing said amplitude value with the corresponding amplitude values of adjacent ones of said channels and comparing said frequency value with corresponding frequency values of adjacent ones of said channels;

processor means for sensing whether a detected signal lies in said respective channel based upon at least one of:
(a) determination of a corresponding amplitudes values of said respective channel and its adjacent neighbor channels relative to said predetermined threshold,
(b) determination of predominance of said frequency value over corresponding frequency values of adjacent neighbor channels,
(c) determination of a difference between said frequency value and that of an adjacent neighbor channel exceeding a predetermined frequency threshold;

a plurality of analog-to-digital converters having their analog inputs connected to respective ones of said antennas;

a reference source capable of outputting a reference digital signal containing at least a local frequency component within one of said N frequency channels identified by said processor means of said channel arbitrator;

a plurality of digital down converter modules, each one of said digital down converter modules having a reference input connected to said reference source and a signal input connected to the digital output of a respective one of said analog-to-digital converters, each said digital down converter modules comprising a multiplier for producing at an output of said digital down converter a product of said reference signal and the signal from the respective one of said antennas; and a digital phase detector having plural phase detector signal inputs connected to the outputs of remaining ones of said digital down converters, said phase detector detecting phase angles of signals on each of said phase detector signal inputs relative to a corresponding signal received at said reference antenna.

18. The receiver of claim 17 wherein said reference signal source comprises:

a digital local oscillator capable of outputting a digital local oscillator signal as said digital reference signal having a local oscillator frequency within a selected one of said N frequency channels.

19. The receiver of claim 17 wherein reference signal source comprises:

memory apparatus capable of receiving and storing digital signals of successive samples of N parallel channelized signals of said N frequency channels;

switch apparatus capable of selecting from said memory apparatus the one digital signal corresponding to the selected one of said frequency channels and applying said one digital signal as said reference signal to said local oscillator input of each of said digital down converter modules.

* * * * *